US008150201B2

(12) United States Patent
Kasai et al.

(10) Patent No.: US 8,150,201 B2
(45) Date of Patent: Apr. 3, 2012

(54) IMAGE PROCESSING APPARATUS, METHOD, AND COMPUTER PROGRAM WITH PIXEL BRIGHTNESS-CHANGE DETECTION AND VALUE CORRECTION

(75) Inventors: Masanori Kasai, Kanagawa (JP); Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 12/041,876

(22) Filed: Mar. 4, 2008

(65) Prior Publication Data
US 2008/0219585 A1 Sep. 11, 2008

(30) Foreign Application Priority Data
Mar. 9, 2007 (JP) .................... 2007-059972

(51) Int. Cl.
*G06K 9/40* (2006.01)
(52) U.S. Cl. ........................ 382/274; 382/275
(58) Field of Classification Search .............. 382/274
See application file for complete search history.

(56) References Cited

U.S. PATENT DOCUMENTS

| 4,972,256 | A | * | 11/1990 | Hirosawa et al. ............ 358/532 |
| 5,323,233 | A | * | 6/1994 | Yamagami et al. ........... 348/277 |
| 5,774,601 | A | * | 6/1998 | Mahmoodi ................... 382/298 |
| 6,825,884 | B1 | * | 11/2004 | Horiuchi ....................... 348/362 |
| 6,912,324 | B2 | * | 6/2005 | Fossum et al. ............... 382/284 |
| 7,202,892 | B1 | * | 4/2007 | Ogata et al. ................ 348/229.1 |
| 7,796,872 | B2 | * | 9/2010 | Sachs et al. ................... 396/55 |
| 2004/0080652 | A1 | * | 4/2004 | Nonaka et al. ............... 348/321 |
| 2004/0091174 | A1 | * | 5/2004 | Wang et al. ................... 382/300 |
| 2004/0136603 | A1 | * | 7/2004 | Vitsnudel et al. ............ 382/254 |
| 2004/0207734 | A1 | * | 10/2004 | Horiuchi ................... 348/229.1 |
| 2006/0017837 | A1 | * | 1/2006 | Sorek et al. ................... 348/362 |
| 2006/0033823 | A1 | * | 2/2006 | Okamura ..................... 348/254 |

(Continued)

FOREIGN PATENT DOCUMENTS
EP 977432 A2 * 2/2000
(Continued)

OTHER PUBLICATIONS

Mitsunaga, T., and Nayar, S. K. 2000. High dynamic range imaging: Spatially varying pixel exposures. In IEEE CVPR, 472-479.*

(Continued)

*Primary Examiner* — Jason M Repko
*Assistant Examiner* — Gandhi Thirugnanam
(74) *Attorney, Agent, or Firm* — Finnegan, Henderson, Farabow, Garrett & Dunner, L.L.P.

(57) ABSTRACT

An image processing apparatus includes the following elements. An image input unit receives a long-time exposure image and a short-time exposure image. An image analysis unit detects a brightness-change pixel in which a brightness change has occurred during a photographic period on the basis of analysis of pixel values in the long-time exposure image and the short-time exposure image. A pixel value correction unit corrects a pixel value of the detected brightness-change pixel. In the pixel value correction unit, a combined image generator selectively combines pixel values in the long-time exposure image and pixel values in the short-time exposure image to generate a combined image; an intermediate image generator generates a blurred image of the combined image; and an output image generator determines a pixel value of the detected brightness-change pixel using a pixel value of a corresponding pixel in each of the combined image and the blurred image.

27 Claims, 20 Drawing Sheets

U.S. PATENT DOCUMENTS

| | | | |
|---|---|---|---|
| 2006/0066750 A1* | 3/2006 | Henderson et al. | 348/362 |
| 2006/0221218 A1* | 10/2006 | Adler et al. | 348/266 |
| 2007/0146538 A1* | 6/2007 | Kakinuma et al. | 348/362 |
| 2008/0012969 A1* | 1/2008 | Kasai et al. | 348/266 |
| 2008/0219585 A1* | 9/2008 | Kasai et al. | 382/274 |
| 2008/0253758 A1* | 10/2008 | Yap et al. | 396/234 |
| 2011/0069205 A1* | 3/2011 | Kasai et al. | 348/239 |
| 2011/0115942 A1* | 5/2011 | Kurita et al. | 348/223.1 |

FOREIGN PATENT DOCUMENTS

| | | | |
|---|---|---|---|
| JP | 2000-050151 | | 2/2000 |
| JP | 2000-050173 | | 2/2000 |
| JP | 2000-059648 | | 2/2000 |
| JP | 2001238128 A * | | 8/2001 |
| JP | 2002-101347 | | 4/2002 |
| JP | 2003-134385 | | 5/2003 |
| JP | 2003-158669 | | 5/2003 |
| JP | 2004-048445 | | 2/2004 |
| JP | 2004-363666 | | 12/2004 |
| JP | 2006280959 A * | | 10/2006 |
| JP | 2008-099158 | | 4/2008 |

OTHER PUBLICATIONS

Kunihiko Hara et al., "A Linear-Logarithmic CMOS Sensor with Offset Calibration Using an Injected Charge Signal", IEEE International Solid-State Circuits Conference, Renesas Technology, Itami, Japan, 2005.

Office Action issued by Japan Patent Office on Sep. 20, 2011, in corresponding Japan Patent Application No. JP 2007-059972 (3 pages).

* cited by examiner

FIG. 7B

| G | Y | G | Y |
|---|---|---|---|
| Y | B | Y | R |
| G | Y | G | Y |
| Y | R | Y | B |

FIG. 7A

| G | B | G | B |
|---|---|---|---|
| R | G | R | G |
| G | B | G | B |
| R | G | R | G |

FIG. 11A

|   |   |   |   |   |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

|   |   |   |   |   |
|---|---|---|---|---|
| 1 | 1 | 1 | 1 | 1 |
| 1 | 3 | 3 | 3 | 1 |
| 1 | 3 | 5 | 3 | 1 |
| 1 | 3 | 3 | 3 | 1 |
| 1 | 1 | 1 | 1 | 1 |

45 / 382

IMAGE PROCESSING APPARATUS, METHOD, AND COMPUTER PROGRAM WITH PIXEL BRIGHTNESS-CHANGE DETECTION AND VALUE CORRECTION

CROSS REFERENCES TO RELATED APPLICATIONS

The present invention contains subject matter related to Japanese Patent Application JP 2007-059972 filed in the Japanese Patent Office on Mar. 9, 2007, the entire contents of which are incorporated herein by reference.

BACKGROUND OF THE INVENTION

1. Field of the Invention

The present invention relates to an image processing apparatus, an imaging apparatus, and an image processing method, and a computer program. Specifically, the present invention relates to an image processing apparatus, an imaging apparatus, an image processing method, and a computer program in which a high-quality output image is generated on the basis of two types of images, that is, a long-time exposure image and a short-time exposure image.

2. Description of the Related Art

Solid-state imaging elements such as a charge-coupled device (CCD) image sensor and a complementary metal oxide semiconductor (CMOS) image sensor used in video cameras, digital still cameras, and the like accumulate electric charge corresponding to an amount of light incident thereon, and output an electrical signal corresponding to the accumulated electric charge, in other words, performs photoelectric conversion. However, there is a limit to the amount of electric charge that can be accumulated in photoelectric conversion elements. When an amount of light more than a certain level is received, the amount of accumulated electric charge reaches a saturation level so that a subject area brighter than a certain value is set to a level of saturated brightness. That is, a "white-out" problem occurs.

To avoid such a white-out phenomenon, a period during which electric charge is accumulated in a photoelectric conversion element is controlled in accordance with a change in ambient light or the like to adjust exposure time to optimally control sensitivity. For example, when a bright subject is photographed, a shutter is released at a high speed to reduce the exposure time to reduce the period during which electric charge is accumulated in the photoelectric conversion element so that an electrical signal is output before the amount of accumulated electric charge has reached the saturation level. This allows output of images with accurate reproduction of grayscale in accordance with subjects.

In the photography of a subject including both bright and dark areas, however, high-speed shutter release does not ensure sufficient exposure time in the dark areas, resulting in deterioration of signal-to-noise (S/N) ratio and low image quality. In a photographed image of such a subject including both bright and dark areas, brightness levels of the bright and dark areas are accurately reproduced by increasing the exposure time in pixels with a small amount of light incident on the image sensor to realize high S/N ratio while avoiding saturation in pixels with a large amount of incident light.

A method for achieving such accurate reproduction is described in, for example, "A Linear-Logarithmic CMOS Sensor with Offset Calibration Using an Injected Charge Signal," IEEE International Solid-State Circuits Conference (ISSCC) 2005, pp. 354, February 2005. Specifically, as shown in FIG. 1, an amplification-type image sensor includes pixels 100 arranged in a matrix, each pixel having a photodiode 101, a transfer transistor 102, a reset transistor 103, an amplification transistor 104, and a selection transistor 105. To turn off the transfer transistor 102, a voltage to be applied to a control electrode of the transfer transistor 102 is set to a level Vtrg that allows excess electrons over a certain value to flow to a floating diffusion (FD) node 106, ether than a standard level for completely turning of the transfer transistor 102.

When the number of electrons accumulated in the photodiode 101 exceeds the level Vtrg, leakage of the excess electrons to the FD node 106 starts to occur in a subthreshold region. The leakage operates within the subthreshold region, and the number of electrons that remains in the photodiode 101 is a logarithmic response.

As shown in FIG. 2, after a reset operation in a period T0, accumulation of electrons is executed while the voltage Vtrg is still applied to the control electrode of the transfer transistor 102. In a period T1 in which the number of accumulated electrons is small, all the electrons are stored in the photodiode 101. When the number of accumulated electrons exceeds the level Vtrg, the electrons start to leak to the FD node 106 as indicated by a period T2.

Due to the leakage in the subthreshold region, electrons are accumulated with a logarithmic characteristic with respect to the incident light intensity even when the accumulation continues (in a period T3). In a period T4, the electrons overflowed to the FD node 106 are reset, and all electrons stored in the photodiode 101 are read by a complete transfer. FIG. 3 shows a relationship between the incident light intensity and the number of output electrons. With respect to an incident light intensity exceeding an upper limit Qlinear of a linear region defined by the voltage Vtrg, the number of output electrons is determined by a logarithmic response.

Although the achievement of a dynamic range of 124 dB is reported in the aforementioned related art, the saturation level of the linear region in which a high S/N ratio can be achieved is less than or equal to a half of a standard saturation level Qs. Further, while a significantly wide dynamic range is achieved by a logarithmic response, a logarithmic response circuit is susceptible to threshold variations or the like of the transfer transistor 102. Therefore, fixed pattern noise as large as 5 mV for the logarithmic region, compared with a fixed pattern noise of 0.8 mV for the linear region, remains in the wide dynamic range even if the threshold variations are canceled.

SUMMARY OF THE INVENTION

It is therefore desirable to provide an image processing apparatus, an imaging apparatus, an image processing method, and a computer program that are adapted to produce a photographed image of a subject including both bright and dark areas, in which two types of images, that is, a long-time exposure image and a short-time exposure image, are generated and image processing is performed on the generated images to obtain a high-quality output image with less whiteout in a high-brightness area and with a high S/N ratio in a low-brightness area.

It is also desirable to provide an image processing apparatus, an imaging apparatus, an image processing method, and a computer program that are adapted to perform image processing on two types of input images, that is, a long-time exposure image and a short-time exposure image, in which a pixel whose brightness level or the like changes due to movement or the like of a subject is detected and is subjected to restrictive processing to prevent grayscale error or false color of the pixel to generate a high-quality image.

According to some embodiments of the present invention, an image processing apparatus includes the following elements. An image input unit is configured to receive a long-time exposure image and a short-time exposure image. An image analysis unit is configured to detect a brightness-change pixel in which it is determined that a brightness change has occurred during a photographic period corresponding to a long-time exposure time on the basis of analysis of pixel values in the long-time exposure image and the short-time exposure image. A pixel value correction unit is configured to correct a pixel value of the brightness-change pixel detected by the image analysis unit. The pixel value correction unit includes the following elements. A combined image generator is configured to selectively combine pixel values in the long-time exposure image and pixel values in the short-time exposure image to generate a combined image. An intermediate image generator is configured to generate an intermediate image, the intermediate image being a blurred image of the combined image. An output image generator is configured to determine a pixel value of the brightness-change pixel detected by the image analysis unit using a pixel value of a corresponding pixel in the combined image and a pixel value of the corresponding pixel in the intermediate image, the corresponding pixel being located at a position corresponding to the brightness-change pixel.

In an embodiment of the present invention, in the image processing apparatus, the output image generator is configured to determine a pixel value of the corresponding pixel in an output image using the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denote the pixel value of the corresponding pixel in the intermediate image, and a and b denote coefficients, wherein a+b=1.

In an embodiment of the present invention, in the image processing apparatus, the image analysis unit is configured to detect a pixel position at which an effective output value is obtained from the short-time exposure image and at which an effective output value is obtained from the long-time exposure image, and is configured to determine that a pixel that is located at the detected pixel position is a brightness-change pixel whose brightness level changes from a high brightness level to a low brightness level.

In an embodiment of the present invention, in the image processing apparatus, the image analysis unit is configured to detect a pixel position at which a pixel value in the long-time exposure image is saturated and at which no effective output value is obtained from the short-time exposure image, and is configured to determine that a pixel that is located at the detected pixel position is a brightness-change pixel whose brightness level changes from a low brightness level to a high brightness level.

In an embodiment of the present invention, in the image processing apparatus, the image analysis unit is configured to perform image conversion on a detection-result image that is based on the detected brightness-change pixel using a smoothing filter, and is configured to exclude a brightness-change pixel that is erroneously detected on the basis of an image obtained as a result of the image conversion.

In an embodiment of the present invention, in the image processing apparatus, the image analysis unit is configured to perform image conversion on a detection-result image that is based on the detected brightness-change pixel using a filter, and is configured to enlarge a brightness-change pixel region.

In an embodiment of the present invention, in the image processing apparatus, the output image generator is configured to determine a pixel value of the corresponding pixel in an output image using coefficients by the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denotes the pixel value of the corresponding pixel in the intermediate image, and a and b denote the coefficients, wherein a+b=1. The output image generator is configured to determine the pixel value of the corresponding pixel in the output image by using, as the coefficients, a first set of coefficients used to determine pixel values of a brightness-change pixel region that is detected on the basis of the combined image, and a second set of coefficients to determine pixel values of the brightness-change pixel region enlarged using the filter, the first set of coefficients and the second set of coefficients having different values from each other.

In an embodiment of the present invention, in the image processing apparatus, the intermediate image generator is configured to apply a smoothing filter to the combined image to generate a blurred image.

In an embodiment of the present invention, in the image processing apparatus, the intermediate image generator is configured to reduce and enlarge the combined image to generate a blurred image.

In an embodiment of the present invention, in the image processing apparatus, the pixel value correction unit further includes an image correction unit configured to reduce a color saturation of the combined image generated by the combined image generator to generate a saturation-reduced image. The intermediate image generator is configured to receive the saturation-reduced image generated by the image correction unit and to generate a blurred image.

In an embodiment of the present invention, in the image processing apparatus, the pixel value correction unit further includes an image correction unit configured to perform an image correction process of applying a low pass filter to an image generated by the output image generator.

In an embodiment of the present invention, in the image processing apparatus, an exposure period in which the long-time exposure image is generated includes an exposure period in which the short-time exposure image is generated, and the short-time exposure image and the long-time exposure image are images generated from an identical pixel by a single imaging element.

According to some embodiments of the present invention, an imaging apparatus includes the following elements. An imaging device is configured to generate a long-time exposure image and a short-time exposure image. An image analysis unit is configured to detect a brightness-change pixel in which it is determined that a brightness change has occurred during a photographic period corresponding to a long-time exposure time on the basis of analysis of pixel values in the long-time exposure image and the short-time exposure image. A pixel value correction unit is configured to correct a pixel value of the brightness-change pixel detected by the image analysis unit. The pixel value correction unit includes the following elements. A combined image generator is configured to selectively combine pixel values in the long-time exposure image and pixel values in the short-time exposure image to generate a combined image. An intermediate image generator is configured to generate an intermediate image, the intermediate image being a blurred image of the combined image. An output image generator is configured to determine a pixel value of the brightness-change pixel detected by the image analysis unit using a pixel value of a corresponding pixel in the combined image and a pixel value of the corresponding pixel in the intermediate image, the corresponding pixel being located at a position corresponding to the brightness-change pixel.

In an embodiment of the present invention, in the imaging apparatus, an exposure period in which the long-time exposure image is generated includes an exposure period in which the short-time exposure image is generated, and the imaging device is configured to generate the short-time exposure image and the long-time exposure image from an identical pixel using a single imaging element.

According to some embodiments of the present invention, an image processing method for performing image processing in an image processing apparatus includes the steps of: by an image input unit, receiving a long-time exposure image and a short-time exposure image; by an image analysis unit, detecting a brightness-change pixel in which it is determined that a brightness change has occurred during a photographic period corresponding to a long-time exposure time on the basis of analysis of pixel values in the long-time exposure image and the short-time exposure image; and by a pixel value correction unit, correcting a pixel value of the detected brightness-change pixel. The step of correcting includes the steps of: generating a combined image by selectively combining pixel values in the long-time exposure image and pixel values in the short-time exposure image; generating an intermediate image, the intermediate image being a blurred image of the combined image; and determining a pixel value of the brightness-change pixel detected by the image analysis unit using a pixel value of a corresponding pixel in the combined image and a pixel value of the corresponding pixel in the intermediate image, the corresponding pixel being located at a position corresponding to the brightness-change pixel.

In an embodiment of the present invention, in the image processing method, the step of determining includes the step of: determining a pixel value of the corresponding pixel in an output image using the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denote the pixel value of the corresponding pixel in the intermediate image, and a and b denote coefficients, wherein a+b=1.

In an embodiment of the present invention, in the image processing method, the step of detecting includes the step of: detecting a pixel position at which an effective output value is obtained from the short-time exposure image and at which an effective output value is obtained from the long-time exposure image to determine that a pixel that is located at the detected pixel position is a brightness-change pixel whose brightness level changes from a high brightness level to a low brightness level.

In an embodiment of the present invention, in the image processing method, the step of detecting includes the step of: detecting a pixel position at which a pixel value in the long-time exposure image is saturated and at which no effective output value is obtained from the short-time exposure image to determine that a pixel that is located at the detected pixel position is a brightness-change pixel whose brightness level changes from a low brightness level to a high brightness level.

In an embodiment of the present invention, in the image processing method, the step of detecting includes the step of: performing image conversion on a detection-result image that is based on the detected brightness-change pixel using a smoothing filter to exclude a brightness-change pixel that is erroneously detected on the basis of an image obtained as a result of the image conversion.

In an embodiment of the present invention, in the image processing method, the step of detecting includes the step of: performing image conversion on a detection-result image that is based on the detected brightness-change pixel using a filter to enlarge a brightness-change pixel region.

In an embodiment of the present invention, in the image processing method, the step of determining includes the step of: determining a pixel value of the corresponding pixel in an output image using coefficients by the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denotes the pixel value of the corresponding pixel in the intermediate image, and a and b denote the coefficients, wherein a+b=1. The pixel value of the corresponding pixel in the output image is determined using, as the coefficients, a first set of coefficients used to determine pixel values of a brightness-change pixel region that is detected on the basis of the combined image, and a second set of coefficients to determine pixel values of the brightness-change pixel region enlarged using the filter, the first set of coefficients and the second set of coefficients having different values from each other.

In an embodiment of the present invention, in the image processing method, the step of generating an intermediate image includes the step of: applying a smoothing filter to the combined image to generate a blurred image.

In an embodiment of the present invention, in the image processing method, the step of generating an intermediate image includes the step of: reducing and enlarging the combined image to generate a blurred image.

In an embodiment of the present invention, in the image processing method, the step of correcting further includes the step of: reducing a color saturation of the generated combined image to generate a saturation-reduced image, and the step of generating an intermediate image includes the step of: receiving the generated saturation-reduced image and generating a blurred image.

In an embodiment of the present invention, in the image processing method, the step of correcting further includes the step of: performing an image correction process of applying a low pass filter to an image generated in the step of determining.

In an embodiment of the present invention, in the image processing method, an exposure period in which the long-time exposure image is generated includes an exposure period in which the short-time exposure image is generated, and the short-time exposure image and the long-time exposure image are images generated from an identical pixel by a single imaging element.

According to some embodiments of the present invention, a computer program for causing an image processing apparatus to execute image processing includes the steps of: causing an image input unit to receive a long-time exposure image and a short-time exposure image; causing an image analysis unit to detect a brightness-change pixel in which it is determined that a brightness change has occurred during a photographic period corresponding to a long-time exposure time on the basis of analysis of pixel values in the long-time exposure image and the short-time exposure image; and causing a pixel value correction unit to correct a pixel value of the brightness-change pixel detected in the step of causing an image analysis unit to detect a brightness-change pixel. The step of causing a pixel value correction unit to correct a pixel value includes the steps of: generating a combined image by selectively combining pixel values in the long-time exposure image and pixel values in the short-time exposure image; generating a blurred image of the combined image; and generating an output image by determining a pixel value of the brightness-change pixel detected by the image analysis unit using a pixel value of a corresponding pixel in the combined image and a pixel value of the corresponding pixel in the intermediate image, the corresponding pixel being located at a position corresponding to the brightness-change pixel.

The computer program is a computer program that can be provided in a computer-readable format for, for example, a general-purpose computer system capable of executing various types of program code through a storage medium or communication medium. Examples of the storage medium include a compact disk (CD), a flexible disk (FD), and a magneto-optical (MO) disk, examples of the communication medium include a network. By providing the program in a computer-readable format, processing in accordance with the program is implemented on a computer system.

Further features and advantages of the present invention will become apparent from the following detailed description of exemplary embodiments of the present invention taken in conjunction with the accompanying drawings. The term system as used herein refers to a logical set of apparatuses regardless of whether or not the apparatuses are housed in a single housing.

According to an embodiment of the present invention, therefore, a long-time exposure image and a short-time exposure image are input, and a wide dynamic range image is generated by selectively combining effective pixel values in the long-time and short-time exposure images. In this process, a brightness-change pixel in which it is determined that a brightness change has occurred during a photographic period corresponding to a long-time exposure time is detected, and the pixel value of the detected brightness-change pixel is replaced to perform an image correction process. Specifically, a blurred image is generated on the basis of the wide dynamic range image, and a pixel value of an output image is determined using a pixel value in each of the generated blurred image and the wide dynamic range image, which is associated with the pixel position of the brightness-change pixel. This can prevent the occurrence of grayscale error or false color of the brightness-change pixel due to movement or the like of a subject, resulting in a high-quality natural-looking output image.

BRIEF DESCRIPTION OF THE DRAWINGS

FIGS. 7A and 7B are diagrams showing examples of a Bayer pattern which is a color pattern used in a typical color filter;

FIGS. 11A and 11B are diagrams showing examples of a low pass filter (LPF) used for image blurring;

DESCRIPTION OF THE PREFERRED EMBODIMENTS

An image processing apparatus, an imaging apparatus, an image processing method, and a computer program according to embodiments of the present invention will be described hereinafter with reference to the drawings.

First Embodiment

Figure 1:
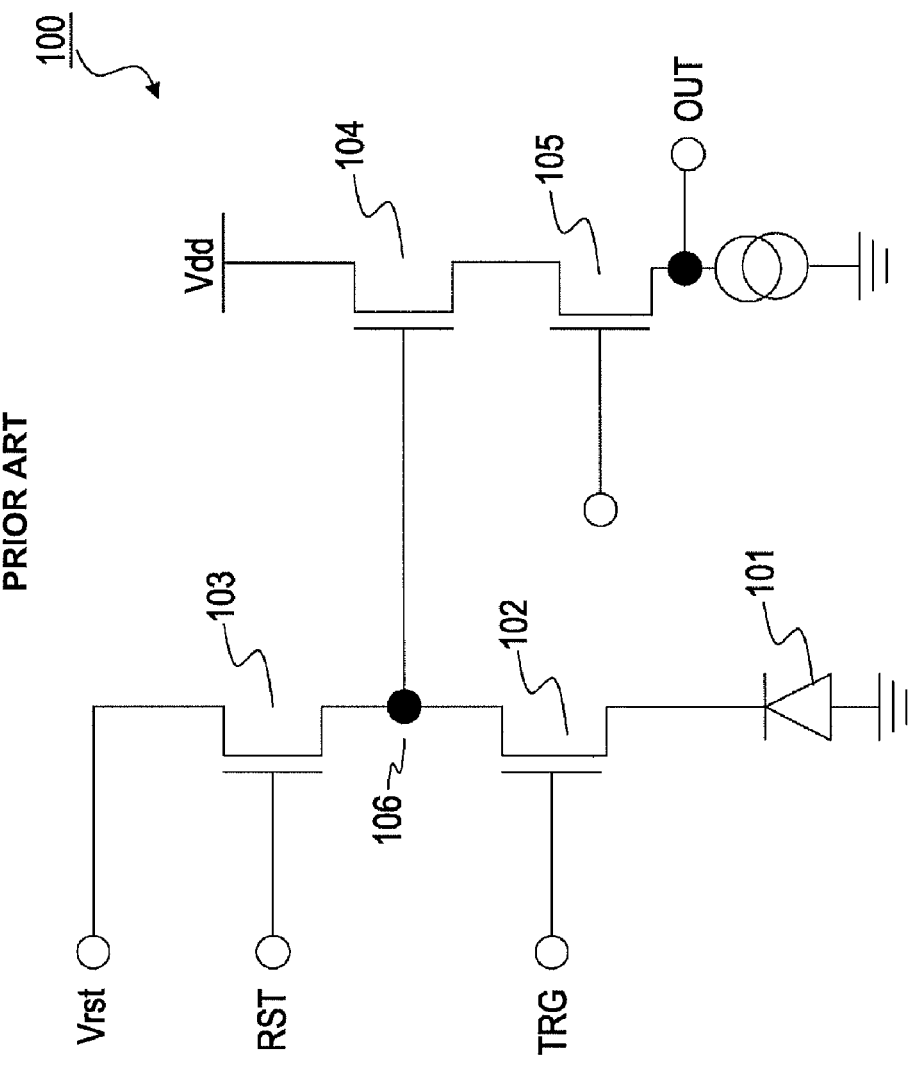
FIG. 1 is a diagram showing an example circuit structure of an imaging device.
Figure 2:
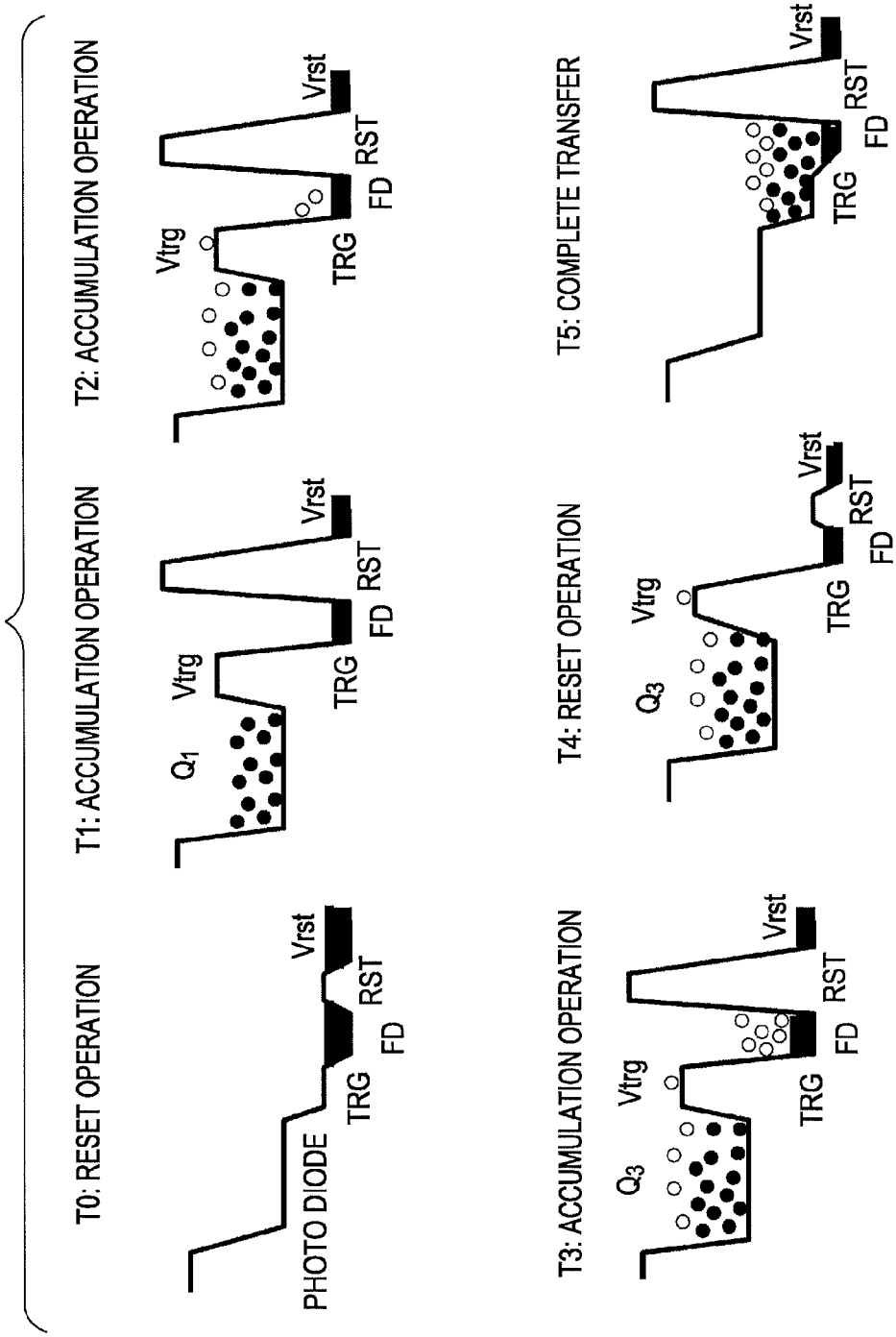
FIG. 2 is a diagram showing an example of the output operation of the imaging device.
Figure 3:
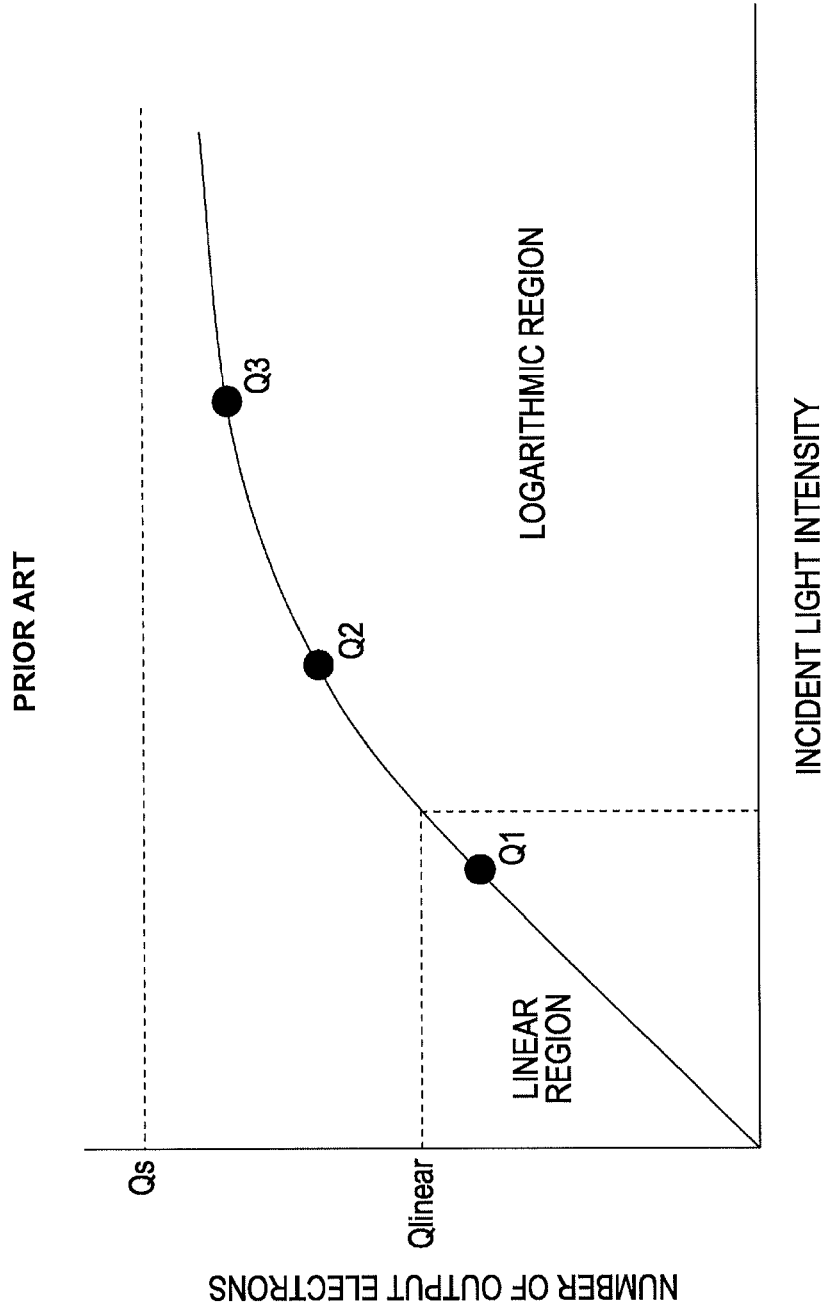
FIG. 3 is a diagram showing a relationship between the incident light intensity on the imaging device and the number of output electrons.
Figure 4:
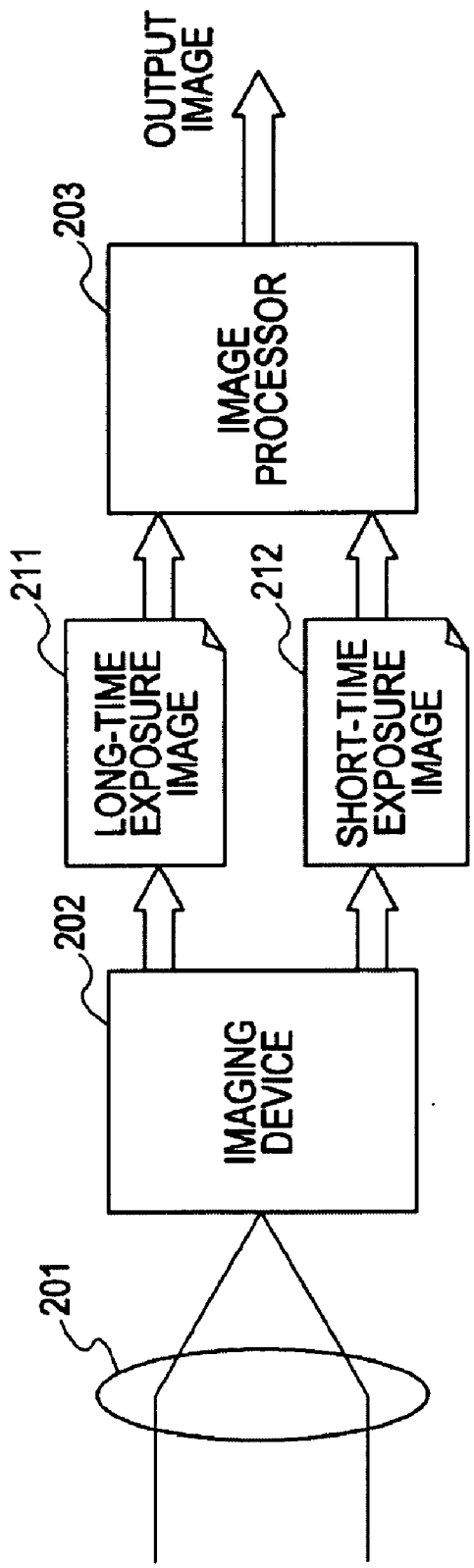
FIG. 4 is a diagram showing an example structure of an image processing apparatus according to a first embodiment of the present invention.

FIG. 4 is a block diagram showing an example structure of an imaging apparatus as an example of an image processing apparatus according to a first embodiment of the present invention. Light entering through an optical lens 201 is incident on an imaging device 202. The imaging device 202 is composed of, for example, a CMOS image sensor, and photoelectrically converts the incident light into image data. The image data is input to an image processor 203. The imaging device 202 generates two types of images, that is, a long-time exposure image 211 and a short-time exposure image 212, and inputs the two types of image data to the image processor 203. The image processor 203 generates an output image based on the long-time exposure image 211 and short-time exposure image 212. The long-time exposure image 211 and short-time exposure image 212 are different in exposure time.

First, a process for generating the two types of images, that is, the long-time exposure image 211 and the short-time exposure image 212, which is performed by the imaging device 202 will be described with reference to FIG. 5. A process for generating images with different exposure times by the imaging device 202 is disclosed in Japanese Patent Application No. 2006-280959, filed Oct. 16, 2006 and assigned to the assignee of the present invention.

The imaging device 202 generates an output image while taking account of a saturation level of each of pixels of the imaging device 202. As described above, an electrical signal output from the imaging device 202 corresponds to the amount of light incident on the imaging device 202. In a certain exposure time (long-time exposure), electrical signals output from photoelectric conversion elements of pixels corresponding to brighter subject areas may reach the saturation level. Those pixels are therefore white-out pixels in which electrical signals corresponding to the saturation level are output so that gray level differences are not perceivable.

To avoid such a white-out phenomenon to obtain an output in which the brightness level of the subject is reflected, the imaging device 202 generates image data with long-time exposure and image data with short-time exposure. The image processor 203 combines the two types of image data and performs other processing to obtain an output image. For example, a pixel whose pixel value is expected to reach the saturation level during long-time exposure is subjected to processing of outputting a pixel value calculated on the basis of data obtained by short-time exposure.

The basic operation of the processing is also disclosed in Japanese Patent Application No. 2006-280959, filed Oct. 16, 2006 and assigned to the assignee of the present invention. In an embodiment of the present invention, the operation of the image processor 203 is further improved. Specifically, in image processing performed on two types of input images, that is, a long-time exposure image and a short-time exposure image, a pixel whose brightness level or the like changes due to movement or the like of a subject is detected and is subjected to restrictive processing to prevent the occurrence of grayscale error or false color of the pixel to generate a high-quality image.

A process for generating image data with different exposure times (the long-time exposure image 211 and the short-time exposure image 212) by the imaging device 202 will be described with reference to FIG. 5. For example, in the photography of a moving image, the imaging device 202 outputs two types of image data with different exposure times within a video rate (30 to 60 fps). Also in the photography of a still image, the imaging device 202 generates and outputs two types of image data with different exposure times. Embodiments of the present invention are applicable to either a still image or a moving image.

Figure 5:
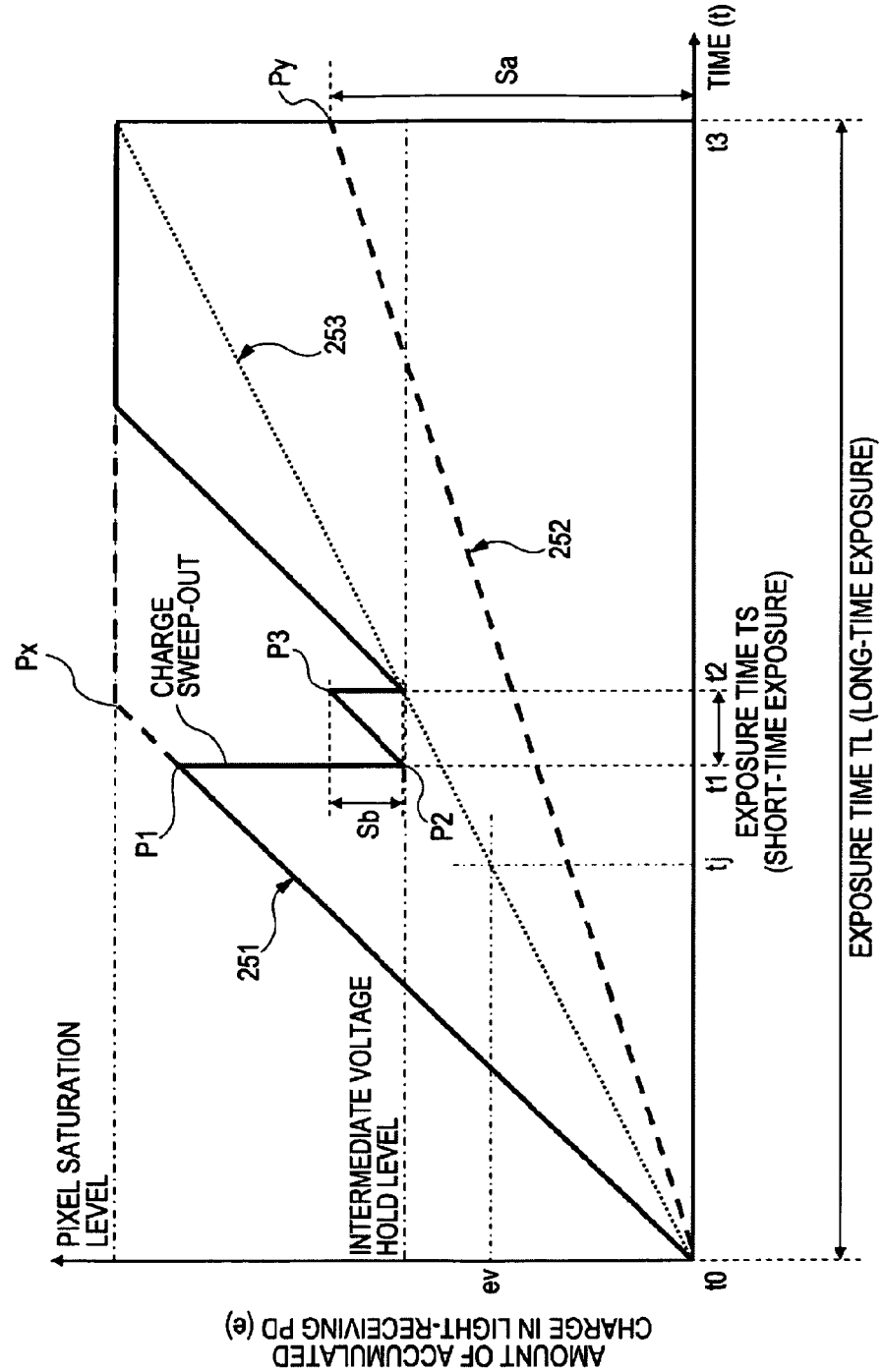
FIG. 5 is a diagram showing a process for generating two types of images, that is, a long-time exposure image and a short-time exposure image.

FIG. 5 is a diagram showing a characteristic of the two types of images with different exposure times generated by the imaging device 202 (the long-time exposure image 211 and the short-time exposure image 212). In FIG. 5, the abscissa axis represents time (t) and the ordinate axis represents the amount of accumulated electric charge (e) in a light-receiving photodiode (PD) of a photoelectric conversion element corresponding to one of pixels of a solid-state imaging element.

For example, in an area where the amount of light received by the light-receiving photodiode (PD) is large, that is, a bright subject area, as indicated by a high-brightness region line 251 shown in FIG. 5, the amount of accumulated electric charge rapidly increases with time. In an area where the amount of light received by the light-receiving photodiode (PD) is small, that is, a dark subject area, on the other hand, as indicated by a low-brightness region line 252 shown in FIG. 5, the amount of accumulated electric charge slowly increases with time.

A period from time t0 to time t3 corresponds to an exposure time TL for obtaining the long-time exposure image 211. For a period of the long-time exposure time TL, as indicated by the low-brightness region line 252, the amount of accumulated electric charge does not reach the saturation level (unsaturation point Py) at time t3. Based on the gray level of the pixel determined using an electrical signal that is obtained on the basis of an amount of accumulated electric charge (Sa), accurate grayscale representation is achieved.

Apparently as indicated by the high-brightness region line 251, the amount of accumulated electric charge has reached the saturation level (saturation point Px) prior to time t3. In such a high-brightness region indicated by the high-brightness region line 251, electrical signals corresponding to the saturation level are output from the long-time exposure image 211, and the corresponding pixels are therefore white-out pixels.

In the high-brightness region indicated by the high-brightness region line 251, at a time prior to time t3, for example, at time t1 (electric-charge sweep-out start point P1), the electric charge in the light-receiving photodiode (PD) is swept out. The electric-charge sweep-out operation is performed for not all the electric charge accumulated in the light-receiving photodiode (PD) but electric charge accumulated up to an intermediate voltage hold level controlled by the photodiode (PD). After the electric-charge sweep-out process, short-time exposure is executed for an exposure period TS (time t1 to time t2). Specifically, as shown in FIG. 5, short-time exposure for a period from a short-time-exposure start point P2 to a short-time-exposure end point P3 is performed. With the short-time exposure, an amount of accumulated electric charge (Sb) is obtained, and the gray level of the pixel is determined using an electrical signal that is obtained on the basis of the amount of accumulated electric charge (Sb).

A pixel value may be determined on the basis of the electrical signal based on the amount of accumulated electric charge (Sa) obtained by long-time exposure in the low-brightness region indicated by the low-brightness region line 252 and the electrical signal based on the amount of accumulated electric charge (Sb) obtained by short-time exposure in the high-brightness region indicated by the high-brightness region line 251. In this case, an amount of accumulated electric charge that is estimated when the high- and low-brightness regions are exposed for the same period of time or an output value of an electrical signal corresponding to the estimated amount of accumulated electric charge is determined, and a pixel value level is determined on the basis of the determination result.

As shown in FIG. 5, in the high-brightness region indicated by the high-brightness region line 251, at a time prior to time t3, for example, at time t1 (electric-charge sweep-out start point P1), the electric charge accumulated in the light-receiving photodiode (PD) is swept out and short-time exposure is executed to obtain an electrical signal based on the amount of electric charge (Sb) accumulated for the short-time exposure period (time t1 to time t2). Thereafter, the exposure operation is continuously performed up to time t3, and electric charge is accumulated up to, for example, the saturation level. An electrical signal based on the electric charge accumulated up to the saturation level is obtained from a long-time exposure image. However, the electrical signal is not applied to the corresponding pixel to determine a pixel value. Accordingly, the imaging device 202 selects, for each pixel, as a signal for determining an effective pixel value, an electrical signal based on an amount of accumulated electric charge as a result of long-time exposure or short-time exposure, and determines pixel values.

The determination of which pixel value of the long-time exposure image or the short-time exposure image to apply to an output image for each pixel is executed at, for example, time tj shown in FIG. 5. If an amount of electric charge more than or equal to a reference amount of electric charge such as an amount of electric charge (ev) shown in FIG. 5 is accumulated for a pixel at time tj shown in FIG. 5, the electric charge accumulated in the light-receiving photodiode (PD) of the pixel is swept out at time t1 (electric-charge sweep-out start point P1) and short-time exposure is executed to determine an output pixel value from the short-time exposure image. If an amount of electric charge more than or equal to the amount of electric charge (ev) is not accumulated for a pixel at time tj, long-time exposure is performed without sweeping out the electric charge, and an output pixel value is determined from the long-time exposure image.

Accordingly, for example, a pixel value of a pixel corresponding to a dark portion of the photographed subject less than a threshold brightness level 253 shown in FIG. 5 is determined using the long-time exposure image 211. On the other hand, a pixel value of a pixel corresponding to a bright portion of the photographed subject more than or equal to the threshold brightness level 253 is determined using the short-time exposure image 212. This ensures the creation of a photographed image of a subject including both bright and dark areas, in which a high-quality high-dynamic-range image without the occurrence of a white-out phenomenon and without a reduction in the S/N ratio in a low-brightness portion is generated.

The above operation, that is, the determination of a pixel value of a pixel corresponding to a dark portion of the photographed subject using the long-time exposure image 211 and the determination of a pixel value of a pixel corresponding to a bright portion of the photographed subject using the short-time exposure image 212, has no problem in a case where the luminosity of the subject does not change over a photographic period. However, for example, in a case where the luminosity of the subject changes due to movement or the like of the subject during the photographic period, a problem occurs.

In the example shown in FIG. 5, it is assumed that the luminosity of the pixels does not change over the photographic period, and both the slope of the high-brightness region line 251 and the slope of the low-brightness region line 252 are unchanging over time. In FIG. 5, therefore, it is assumed that the luminosity is constant over the photographic period. Therefore, linearly increasing lines are exhibited for all the time, except for the time at which the amount of accumulated electric charge is reduced by the electric-charge sweep-out operation.

Figure 6:
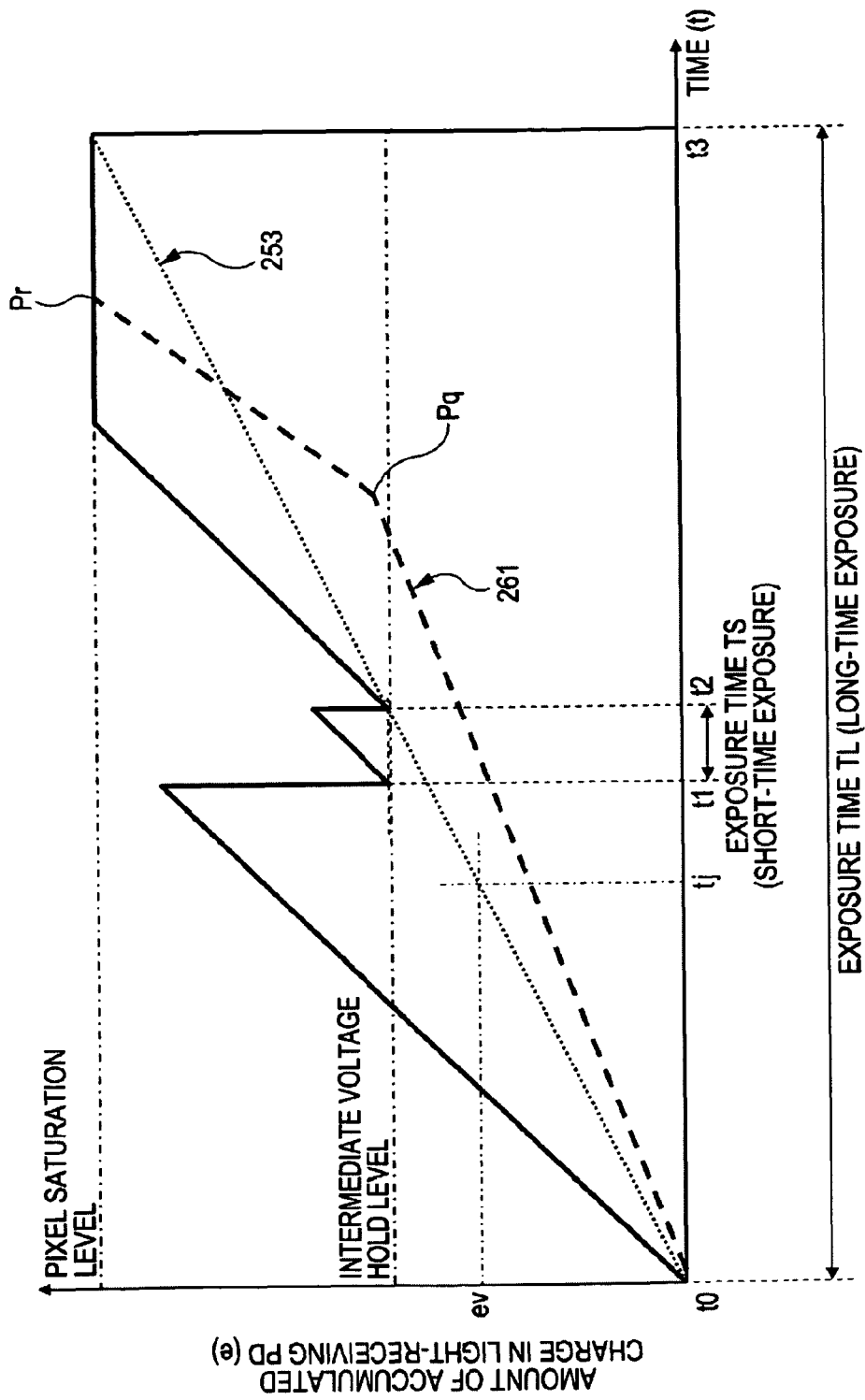
FIG. 6 is a diagram showing the effect of a change in the brightness level of a subject in the process for generating two types of images, that is, a long-time exposure image and a short-time exposure image.

For example, in a case where the subject moves in the photographic period, the luminosity of the subject associated with the pixels is not constant but changes. FIG. 6 shows an example of time transition of the amount of electric charge (e) accumulated in the light-receiving photodiode (PD) of the imaging device 202 when the luminosity of the subject changes. In FIG. 6, like FIG. 5, the abscissa axis represents time (t) and the ordinate axis represents the amount of electric charge (e) accumulated in a light-receiving photodiode (PD) of a photoelectric conversion element corresponding to one of pixels of a solid-state imaging element.

A brightness-change region line 261 indicates the transition of the amount of electric charge (e) accumulated in a light-receiving photodiode (PD) corresponding to a pixel that is in a low-brightness region at the middle of the photographing operation (at a point Pq FIG. 6) and that suddenly becomes bright. For example, a bright object suddenly moves into the focus area, or a dark object moves away and a bright background object appears. As indicated by the brightness-change region line 261, the amount of accumulated electric charge (e) has reached the saturation level (a point Pr shown in FIG. 6) prior to the time at which the long-time exposure period ends (time t3).

Based on the determination that the brightness-change region line 261 represents a pixel in which an amount of electric charge more than or equal to the amount of electric charge (ev) is not accumulated at time tj, the imaging device 202 performs long-time exposure without sweeping out the electric charge. As a consequence, the pixel value of the pixel represented by the brightness-change region line 261 becomes a white-out pixel whose level is equal to the saturation level.

Accordingly, in a case where the brightness level of the subject changes in a photographic period, inaccurate representation of pixel value levels may occur even with the use of a long-time exposure image and a short-time exposure image. Such a problem becomes more serious when, for example, a solid-state imaging element suitable for color imaging including color filters such as red, green, and blue filters is used.

A typical single-chip color solid-state imaging element includes a color filter array bonded to a surface thereof, the color filter array being configured to allow only a specific wavelength component of each pixel to pass therethrough, and is configured such that a desired color component is recovered using a set of pixels. The color filter array may include a color pattern shown in FIG. 7A representing red (R), green (G), and blue (B), or a color pattern shown in FIG. 7B representing a combination of white (Y), which serves as a luminance signal, and red (R), green (G), and blue (B). In a single-chip color solid-state imaging element, since each pixel has only information concerning a single color component, interpolation is performed using color information concerning neighboring pixels to recover a desired color component in each pixel. This process is referred to as a demosaic process.

When such a solid-state imaging element suitable for color imaging including color filters such as red, green, and blue filters is used, sensitivity information is generally different among red, green, and blue pixels due to influences such as the spectral sensitivity of the solid-state imaging element, ambient light, and the reflectance of the subject. Thus, grayscale error as described above may occur at different positions of the red, green, and blue pixels. If one or two pieces of information concerning the red, green, and blue pixels are not correct, for example, false colors of red, green, and blue or complementary colors thereof may be produced even if the subject is actually achromatic. Moreover, false colors may change depending on positions.

As described above, the determination of a pixel value of a pixel corresponding to a dark portion of the photographed subject using a long-time exposure image and the determination of a pixel value of a pixel corresponding to a bright portion of the photographed subject using a short-time exposure image have no problem in a case where the luminosity, color, or the like of the subject does not change over a photographic period. However, for example, in a case where, the luminosity, color, or the like changes due to movement or the like of the subject during the photographic period, a problem occurs. In a region where the subject moves, problems such as the occurrence of false colors or grayscale error would occur.

The image processor 203 according to the first embodiment of the present invention executes a process for solving the problems. Specifically, a high-quality output image is generated on the basis of the two types of images with different exposure times generated by the imaging device 202.

Figure 8:
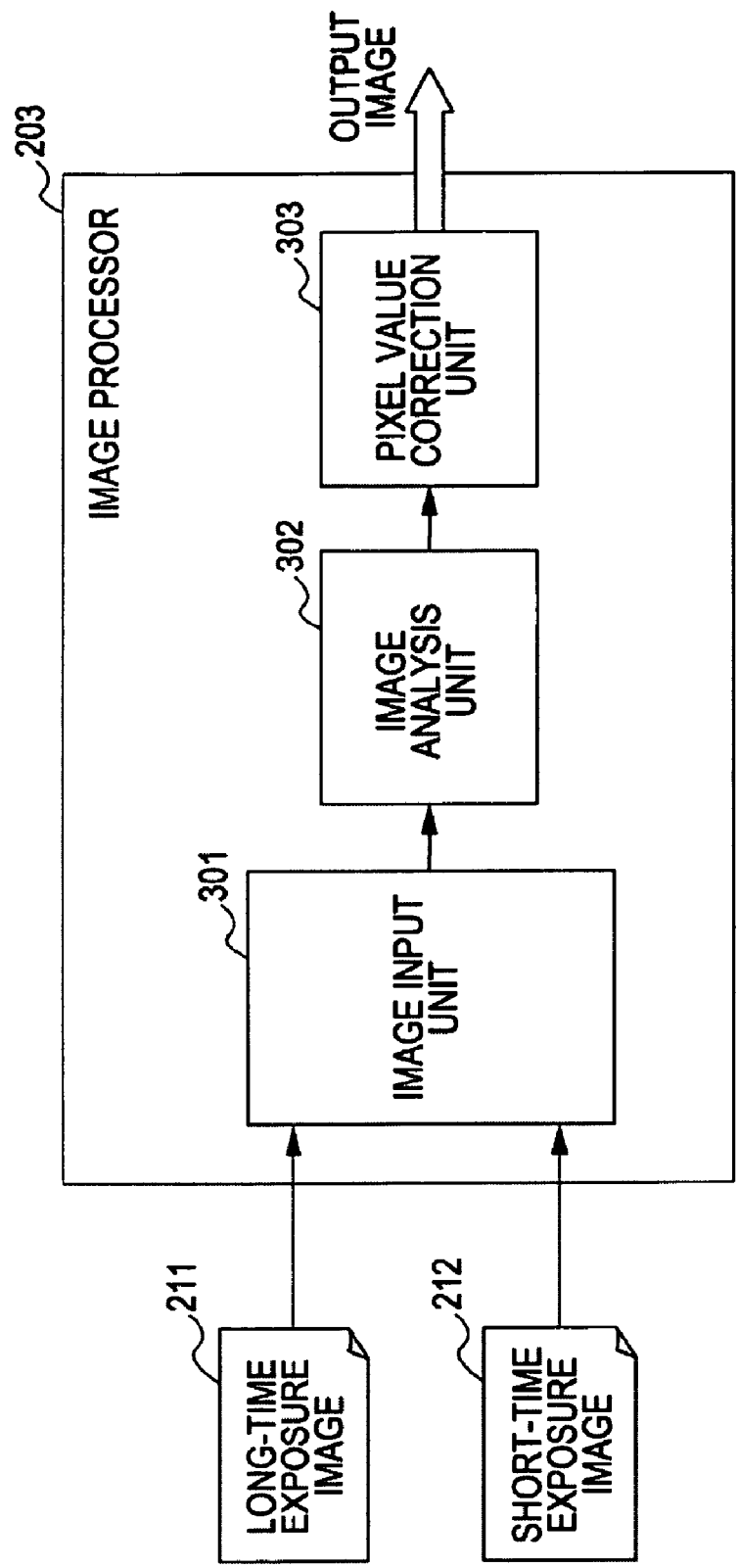
FIG. 8 is a diagram showing an example structure of an image processor in the image processing apparatus.

FIG. 8 shows an example structure of the image processor 203. The image processor 203 includes an image input unit 301 configured to receive input images, that is, the long-time exposure image 211 and the short-time exposure image 212, an image analysis unit 302 configured to detect a pixel position at which it is determined that a pixel value changes in a moving subject region or the like on the basis of the input images, and a pixel value correction unit 303 configured to execute pixel value correction by replacing a pixel value of a pixel at the pixel position detected by the image analysis unit 302 with a new pixel value.

Figure 9:
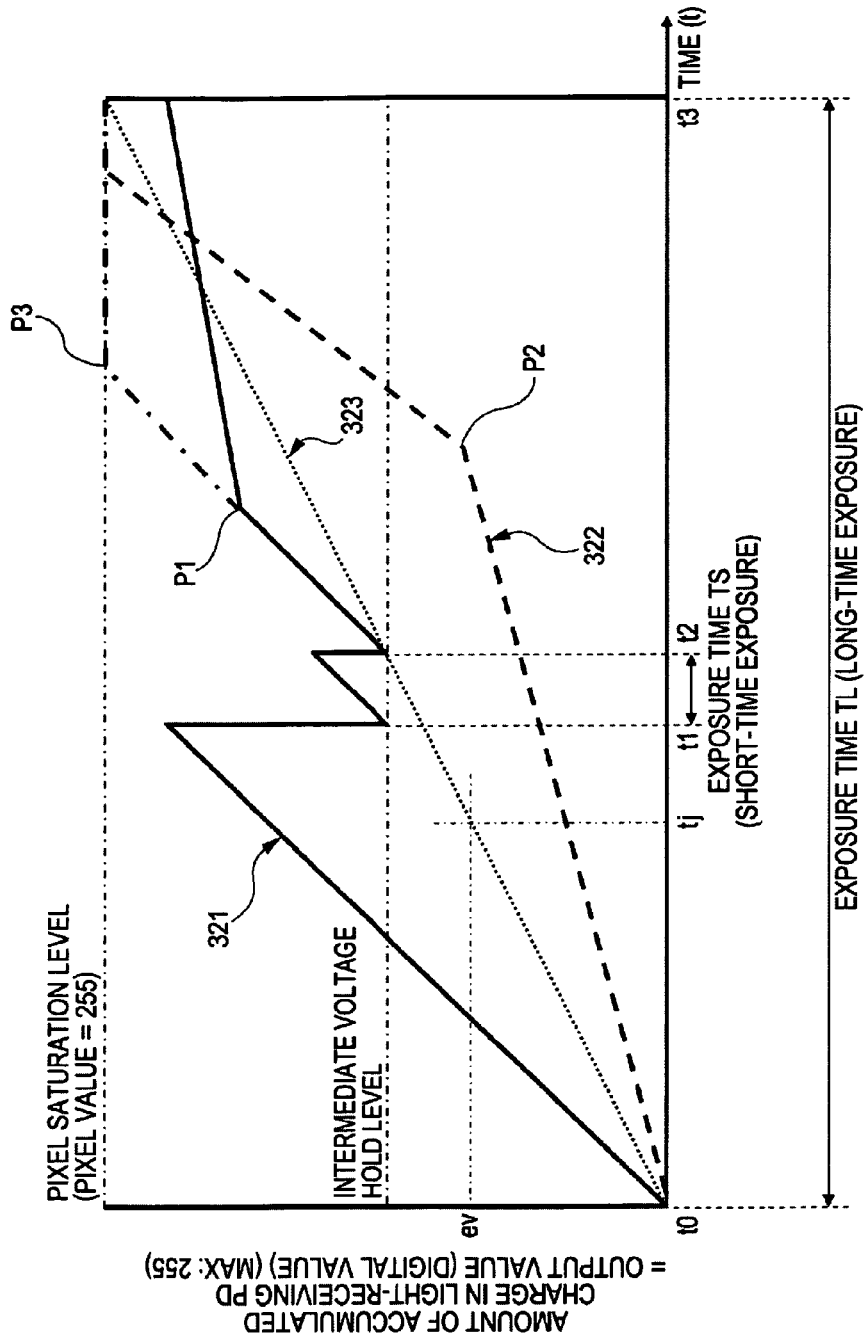
FIG. 9 is a diagram showing a specific example of the operation of the image processor.

A specific example of the operation of the image processor 203 will be described with reference to FIG. 9. In FIG. 9, like FIGS. 5 and 6, the abscissa axis represents time (t) and the ordinate axis represents the amount of electric charge (e) accumulated in a light-receiving photodiode (PD) of a photoelectric conversion element corresponding to one of pixels of a solid-state imaging element as the imaging device 202.

The amount of electric charge (e) accumulated in the light-receiving photodiode (PD) has a maximum value of 255 which is an output value (digital data ranging from 0 to 255) of an image. In a case where the brightness does not change over time, a threshold line 323 indicated by a dotted line is a boundary between a low-brightness signal and a high-brightness signal. FIG. 9 shows two brightness-change pixel lines, that is, a brightness-change pixel lines A 321 and a brightness-change pixel lines B 322. The brightness-change pixel line A 321 changes from a high brightness level to a low brightness level at a point P1 due to, for example, movement of the subject, and the brightness-change pixel line B 322 changes from a low brightness level to a high brightness level at a point P2.

As described above, the imaging device 202 determines at, for example, time tj whether or not each pixel stores a larger amount of electric charge than the amount of accumulated electric charge (ev) defined by the threshold line 323, and determines whether to perform long-time exposure or short-time exposure. If a pixel stores a larger amount of electric charge than the amount of accumulated electric charge (ev) defined by the threshold line 323, it is determined that the pixel is in a high-brightness region, and a light-receiving photodiode (PD) corresponding to the pixel is subjected to electric-charge sweep-out processing similar to that described above with reference to FIG. 5 to reduce the amount of accumulated electric charge to the intermediate voltage hold level. Thereafter, short-time exposure for a period from time t1 to time t2 is performed and the pixel value of the pixel is set in the short-time exposure image 212 in which a pixel value based on the amount of accumulated electric charge obtained as a result, of the short-time exposure is set. On the other hand, if a pixel stores an amount of accumulated electric charge less than or equal to the amount of accumulated electric charge (ev) defined by the threshold line 323 at time tj, it is determined that the pixel is in a low-brightness region, and a light-receiving photodiode (PD) corresponding to the pixel is subjected to long-time exposure for a period from time t0 to time t3 without sweeping out the electric charge. The pixel value of the pixel is set in the long-time exposure image 211 in which a pixel value based on the amount of accumulated electric charge obtained as a result of the long-time exposure is set.

The image input unit 301 of the image processor 203 shown in FIG. 8 receives the thus generated long-time exposure image 211 and short-time exposure image 212, and outputs them to the image analysis unit 302. The image analysis unit 302 detects a pixel position at which it is determined that a pixel value changes in a moving subject region or the like on the basis of the two types of images. A pixel value may change in two cases: (a) the brightness level of the subject changes from a high brightness level to a low brightness level, and (b) the brightness level of the subject changes from a low brightness level to a high brightness level.

The image analysis unit 302 detects a pixel position at which brightness changes in each of the above two cases (a) and (b) using different techniques.

First, a process for detecting (a) a pixel position at which a brightness level of the subject changes from a high brightness level to a low brightness level, which is performed by the image analysis unit 302, will be described. In FIG. 9, the brightness-change pixel line A 321 is a line indicating a pixel whose brightness level changes from a high brightness level to a low brightness level at the point P1 due to, for example, movement of the subject.

If effective pixel information concerning a pixel position at which a brightness level changes from a high brightness level to a low brightness level as indicated by the brightness-change pixel line A 321 is obtained in the short-time exposure image 212, it is determined that the pixel position is a pixel position subjected to short-time exposure for a short period (TS) from time t1 to time t2.

In the long-time exposure image 211, therefore, the pixel value of a pixel corresponding to the pixel position is generally at the saturation level, and no effective signal is obtained. As shown in FIG. 9, after electric charge is measured (output) after the short-time exposure process for a short period (TS) from time t1 to time t2, the accumulation of electric charge is restarted after time t2. If the pixel is still at a high-brightness level, the amount of electric charge accumulated in a light-receiving photodiode (PD) corresponding to the pixel reaches the saturation level at a point P3, and the pixel level of the pixel in the long-time exposure image 211 is equal to the saturation level (a pixel value of 255), resulting in a white-out pixel.

If a brightness level of the subject associated with the pixel changes in a photographic period or a long-time exposure period (from time t0 to time t3), namely, if a brightness level of the subject decreases at the point P1 shown in FIG. 9, the slope of the brightness-change pixel line A 321 becomes slow after the point P1. In other words, the speed at which electric charge is accumulated in the light-receiving photodiode (PD) is lowered.

If a brightness level of the subject does not change, normally, the amount of electric charge accumulated in the light-receiving photodiode (PD) reaches the saturation level at the point P3, and the pixel level of the pixel in the long-time exposure image 211 is equal to the saturation level (a pixel value of 255), resulting in a white-out pixel. However, as shown in FIG. 9, if a brightness level of the subject decreases and the speed at which electric charge is accumulated in the light-receiving photodiode (PD) is lowered at the point P1, the pixel level of the pixel in the long-time exposure image 211 becomes less than or equal to the saturation level (a pixel value of 255), and an effective output pixel value (pixel value less than 255) is obtained.

The process for detecting (a) a pixel position at which a brightness level of the subject changes from a high brightness level to a low brightness level, which is performed by the image analysis unit 302, is executed according to the analysis of the phenomenon described above. Specifically, it is determined whether or not effective output values are obtained from the short-time exposure image 212 and the long-time exposure image 211 (hereinafter referred to as "determination condition 1").

It is determined that a pixel satisfying the determination condition 1 is at (a) the pixel position at which a brightness level of the subject changes from a high brightness level to a low brightness level.

The effective output values in the short-time exposure image 212 and the long-time exposure image 211 are determined by comparison with a predetermined threshold value.

For example, an effective output value of the short-time exposure image 212 is determined by comparing a pixel value (0 to 225) detected from an electrical signal based on the amount of electric charge accumulated by short-time exposure with a threshold value "10". If the detected pixel value is greater than the threshold value "10" (detected pixel value>10), it is determined that the detected pixel value is an effective output value.

An effective output value of the long-time exposure image 211 is determined by comparing a pixel value (0 to 225) detected from an electrical signal based on the amount of electric charge accumulated by long-time exposure with a threshold value "230". If the detected pixel value is smaller than the threshold value "230" (detected pixel value<230), it is determined that the detected pixel value is an effective pixel value.

The threshold values in the above determination formulae, such as 10 and 230, are merely examples. The threshold value used for determining an effective output value of the short-time exposure image 212 may be preferably a value that allows determination of whether or not an output value higher than noise of the imaging element is ensured. The threshold value used for determining an effective output value of the long-time exposure image 211 may be preferably a value that ensures accurate grayscale representation while taking account of a knee characteristic of the imaging element. The above-described determination processes using the threshold values may not be used or may be used in combination to observe each of actual images to subjectively estimate the images to determine whether or not an effective pixel value is obtained.

Next, the process for detecting (b) a pixel position at which a brightness level of the subject changes from a low brightness level to a high brightness level, which is performed by the image analysis unit 302, will be described. In FIG. 9, the brightness-change pixel line B 322 is a line indicating to a pixel whose brightness level changes from a low brightness level to a high brightness level at the point P2 due to, for example, movement of the subject.

This pixel becomes a saturated white-out pixel (a pixel value of 255) in the long-time exposure image 211 generated by long-time exposure for a period from time t0 to time t3, and no effective output is obtained.

For a pixel that becomes a saturated white-out pixel (a pixel value of 255) in the long-time exposure image 211, an effective pixel value can be determined from the short-time exposure image 212 in a pixel region where the brightness does not change. However, the brightness-change pixel line B 322 changes from a low brightness level to a high brightness level at the point P2, and the operation for obtaining an effective pixel value of the short-time exposure image 212, or the electric-charge sweep-out and short-time exposure operations described above with reference to FIG. 5, is not performed. Therefore, no effective pixel value is obtained from the short-time exposure image 212.

The process for detecting (b) a pixel position at which a brightness level of the subject changes from a low brightness level to a high brightness level, which is performed by the image analysis unit 302, is executed according to the analysis of the phenomenon described above. Specifically, it is determined whether or not a pixel value of the long-time exposure image 211 is saturated and no effective output value is obtained from the short-time exposure image 212 (hereinafter referred to as "determination condition 2").

It is determined that a pixel satisfying the determination condition 2 is at (b) the pixel position at which a brightness level of the subject changes from a low brightness level to a high brightness level.

The determination as to whether or not a pixel value of the long-time exposure image 211 is saturated or the determination as to whether or not no effective output value is obtained from the short-time exposure image 212 is performed by comparison with a predetermined threshold value.

For example, the determination as to whether or not a pixel value of the long-time exposure image 211 is saturated is performed by comparing a pixel value (0 to 225) detected from an electrical signal based on the amount of electric charge accumulated by long-time exposure with a threshold value "240". If the detected pixel value is more than or equal to the threshold value "240" (detected pixel value≧240), it is determined that the detected pixel value is a saturated pixel value.

The determination as to whether or not no effective output value is obtained from the short-time exposure image 212 is performed by comparing a pixel value (0 to 225) detected from an electrical signal based on the amount of electric charge accumulated by short-time exposure with a threshold value "5". If the detected pixel value is less than or equal to the threshold value "5" (detected pixel value≦5), it is determined that no effective output value is obtained.

The threshold values in the above determination formulae, such as 240 and 5, are merely examples. The threshold value used for determining whether a pixel value of the long-time exposure image 211 is saturated may be preferably a value that ensures a region in which inaccurate grayscale representation has occurred while taking account of a knee characteristic of the imaging element. The threshold value used for determining whether no output value is obtained from the short-time exposure image 212 may be preferably a numerical value that allows determination of whether or not to ensure a noise level of the imaging element. The above-described determination processes using the threshold values may not be used or may be used in combination to observe each of actual images to subjectively estimate the images to determine whether or not an effective pixel value is obtained.

A specific example of the detection process of a brightness-change pixel will be described with reference to FIGS. 10A and 10B. FIG. 10A shows movement of the subject in a long-time exposure period (from time t0 to time t3). In a bright background, a dark rectangular subject 351 laterally moves to a subject position 352.

Figure 10B:
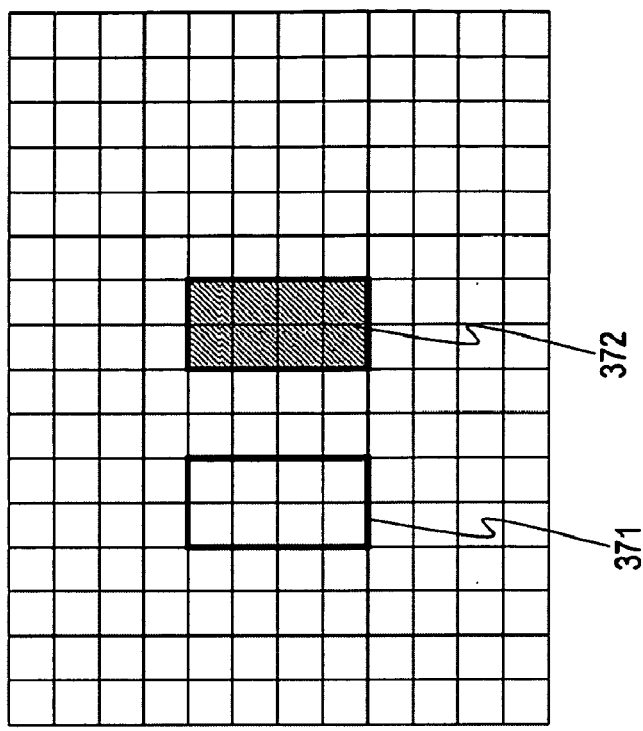
FIGS. 10A and 10B are diagrams showing a specific example of a process for detecting brightness-change pixels.
Figure 10A:
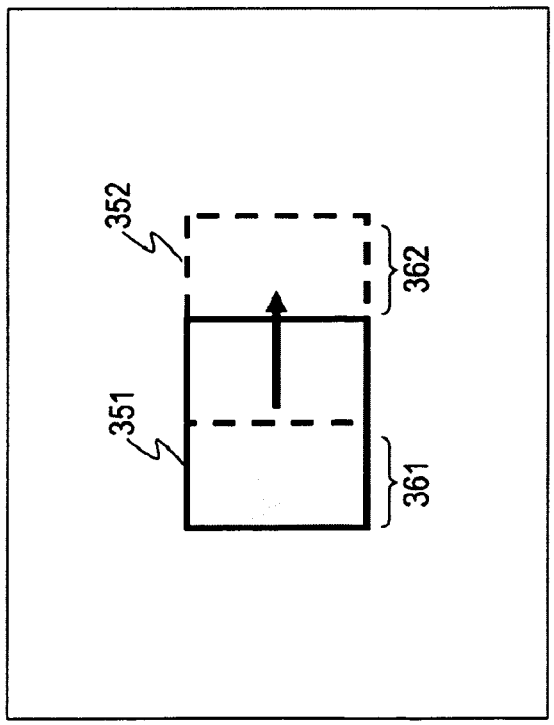

FIG. 10B shows pixel positions obtained as a result of the above-described detection processes performed by the image analysis unit 302, that is, the detection process of (a) a pixel position at which a brightness level of the subject changes from a high brightness level to a low brightness level, and the detection process of (b) a pixel position at which a brightness level of a subject changes from a low brightness level to a high brightness level.

In FIG. 10B, each grid cell represents a pixel. Since the subject 351 shown in FIG. 10A has a low brightness level, the brightness level of imaging pixels within a region corresponding to a region 362 located ahead in the direction of movement of the subject 351 changes from a high brightness level to a low brightness level. The pixel region 362 is detected by the above detection process of (a) a pixel position at which a brightness level of the subject changes from a high brightness level to a low brightness level, that is, by determining whether or not the determination condition 1 is satisfied, namely, whether or not effective output values are obtained from the short-time exposure image 212 and the long-time exposure image 211. A pixel position 372 shown in FIG. 10B satisfies the determination condition 1.

Further, since the subject 351 shown in FIG. 10A has a low brightness level, the brightness level of imaging pixels within a region corresponding to a region 361 located behind in the direction of movement of the subject 351 changes from a low brightness level to a high brightness level. The pixel region 361 is detected by the above detection process of (b) a pixel position at which a brightness level of the subject changes from a low brightness level to a high brightness level, that is, by determining whether or not the determination condition 2 is satisfied, namely, whether or not a pixel value of the long-time exposure image 211 is saturated and no effective output value is obtained from the short-time exposure image 212. A pixel position 371 shown in FIG. 10B satisfies the determination condition 2.

Accordingly, the image analysis unit 302 of the image processor 203 shown in FIG. 8 detects (a) a pixel position at which a brightness level of the subject changes from a high brightness level to a low brightness level and (b) a pixel position at which a brightness level of the subject changes from a low brightness level to a high brightness level on the basis of a pixel value of the long-time exposure image 211 and a pixel value of the short-time exposure image 212.

The pixel position detection processes of the image analysis unit 302 may be performed on input mosaic data (raw data) that is not subjected to interpolation of pixel values or input demosaic data that is subjected to interpolation of pixel values if a single-chip solid-state imaging element suitable for color imaging described above with reference to FIG. 7A or 7B is used. The set of the long-time exposure image 211 and the short-time exposure image 212 for use in the analysis is a set of mosaic data or a set of demosaic data.

Next, a pixel value correction process performed by the pixel value correction unit 303 of the image processor 203 shown in FIG. 8 will be described. The pixel value correction unit 303 corrects a pixel value of a pixel located at each of the pixel positions detected by the image analysis unit 302, namely, (a) a pixel position at which a brightness level of the subject changes from a high brightness level to a low brightness level, and (b) a pixel position at which a brightness level of the subject changes from a low brightness level to a high brightness level.

In the technique disclosed in Japanese Patent Application No. 2006-280959, assigned to the assignee of the present invention, mentioned above, two types of input images, that is, the long-time exposure image 211 and the short-time exposure image 212, are obtained, and a pixel value of a pixel corresponding to a dark portion of the photographed subject less than the threshold brightness level 253 shown in FIG. 5 is determined using the long-time exposure image 211 while a pixel value of a pixel corresponding to a bright portion of the photographed subject more than or equal to the threshold brightness level 253 is determined using the short-time exposure image 212. Thus, alternative processing is performed, that is, one of the pixel value of the long-time exposure image 211 and the pixel value of the short-time exposure image 212 is selected to generate a combined image. The combined image obtained by the alternative processing is hereinafter referred to as a "wide dynamic range image".

However, as described with reference to FIG. 9, the thus generated wide dynamic range image is an image in which pixel values of pixels located at (a) a pixel position at which a brightness level of the subject changes from a high brightness level to a low brightness level and (b) a pixel position at which a brightness level of the subject changes from a low brightness level to a high brightness level are incorrect and in which grayscale error or false colors occur. In image processing according to the first embodiment of the present invention, the pixel value correction unit 303 of the image processor 203 corrects the pixels to prevent the occurrence of grayscale error or false colors of the pixels to generate a high-quality image.

The pixel value correction unit 303 performs a pixel value correction process by replacing a pixel value of a pixel located at each of the pixel positions detected by the image analysis unit 302, namely, (a) a pixel position at which a brightness level of the subject changes from a high brightness level to a low brightness level, and (b) a pixel position at which a brightness level of the subject changes from a low brightness level to a high brightness level, with a corrected pixel value. The pixel value correction process is performed with consideration of the following points.

Since a subject image displayed at the pixel positions detected by the image analysis unit 302 at which a brightness change has occurred is possibly moving, a high-frequency component of the image is not important and it is not unnatural if the image is blurred. Based on this assumption, the pixel value correction unit 303 creates blurred image data from the wide dynamic range image generated selectively using one of the pixel value of the long-time exposure image 211 and the pixel value of the short-time exposure image 212, and sets a pixel value of a pixel position at which a brightness change has occurred using the blurred image data.

The image blurring operation is performed using, for example, a typical low pass filter (LPF). FIGS. 11A and 11B show two examples of the available low pass filter (LPF). FIG. 11A shows a simple smoothing filter with a size of 5×5 pixels, such as a filter configured to add a pixel value of a target pixel 381 at the center and pixel values of the neighboring 5×5 pixels, which are equally weighted by a factor of $\frac{1}{25}$, and to set a pixel value. FIG. 11B shows a weighting filter with a size of 5×5 pixels, such as a filter configured to add a pixel value of a target pixel 382 at the center and pixel values of the neighboring 5×5 pixels, which are weighted by a factor of $\frac{1}{45}$ to $\frac{5}{45}$ according to the positions, and to set a pixel value.

For the purpose of blurring an image, the size (the number of taps) of the filter used is adjusted by taking account of the two-dimensional broadening of an imaging pixel in which a brightness change has occurred (hereinafter referred to as a "brightness-change pixel"). For example, in a case where a region of brightness-change pixels is detected in the manner shown in FIG. 10B, four pixels are provided on a long side of the region of the brightness-change pixels, and the filter may have the same size or more, for example, about five taps. The number of taps more than or equal to five taps, such as seven taps or nine taps, would not have a large effect on a final result. The above size of the detected pixels is merely an example.

The above-described replacement process may be performed on mosaic data (raw data) or data subjected to pixel interpolation in a case where a single-chip solid-state imaging element suitable for color imaging is used.

Figure 12:
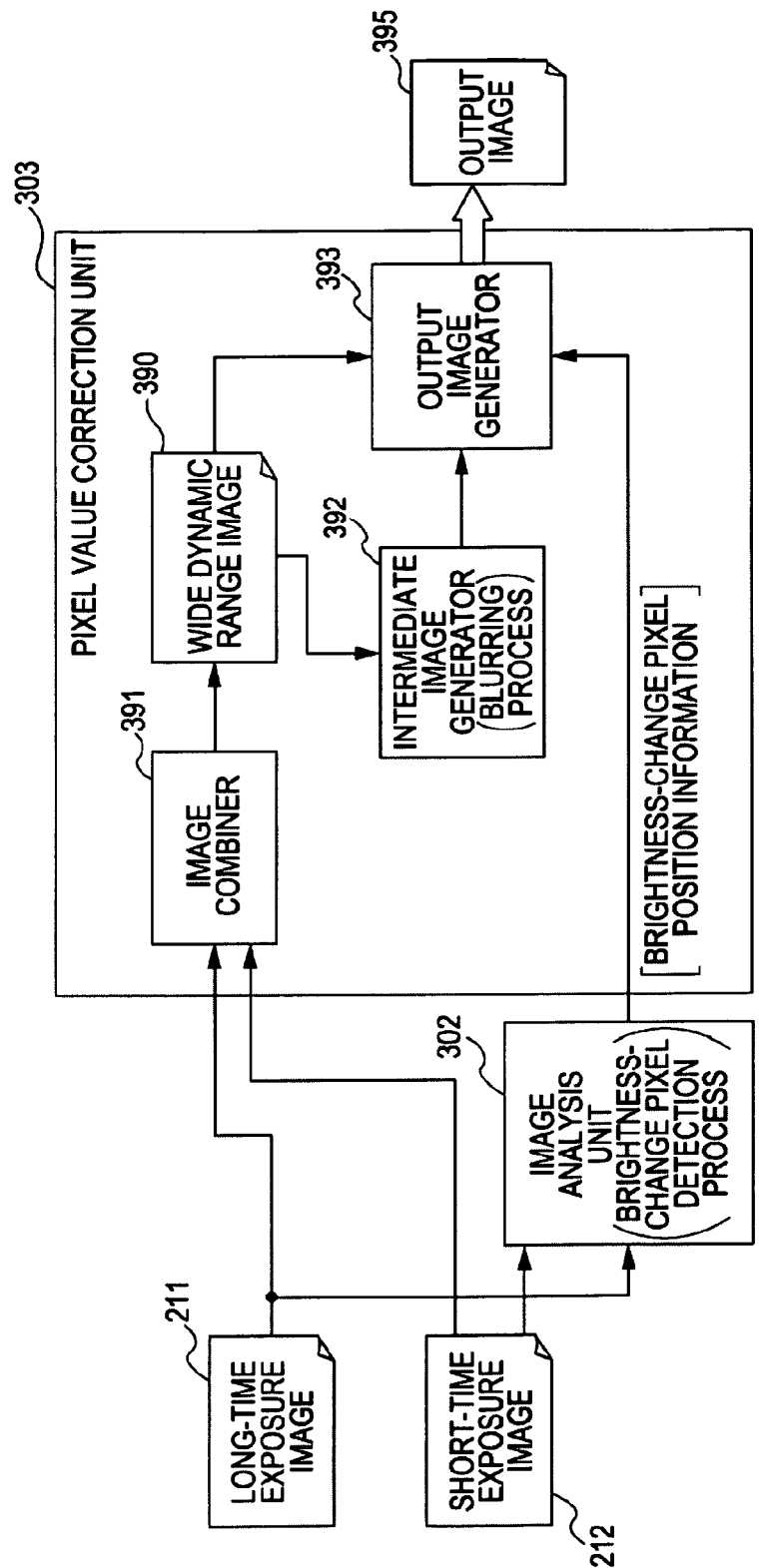
FIG. 12 is a diagram showing the detailed structure and operation of a pixel value correction unit in the image processing apparatus.

The detailed structure and operation of the pixel value correction unit 303 will be described with reference to FIG. 12. The two types of image data with different exposure times generated by the imaging device 202 shown in FIG. 4, that is, the long-time exposure image 211 and the short-time exposure image 212, are input to the image analysis unit 302 where a brightness-change pixel is detected and an image combiner 391 of the pixel value correction unit 303.

As described above, the image analysis unit 302 detects (a) a pixel position at which a brightness level of the subject changes from a high brightness level to a low brightness level and (b) a pixel position at which a brightness level of the subject changes from a low brightness level to a high brightness level on the basis of a pixel value of the long-time exposure image 211 and a pixel value of the short-time exposure image 212. Information concerning the detected pixel positions (hereinafter referred to as "brightness-change pixel position information" or "brightness-change pixel positions") is input to an output image generator 393 of the pixel value correction unit 303.

The image combiner 391 of the pixel value correction unit 303 generates a combined image based on the long-time exposure image 211 and the short-time exposure image 212. Specifically, according to the technique also disclosed in Japanese Patent Application No. 2006-280959, assigned to the assignee of the present invention, mentioned above, the image combiner 391 performs alternative processing to generate a wide dynamic range image 390. For example, a pixel value of a pixel corresponding to a dark subject portion less than the threshold brightness level 253 shown in FIG. 5 is determined using the long-time exposure image 211, and a pixel value of a pixel corresponding to a bright subject portion more than or equal to the threshold brightness level 253 is determined using the short-time exposure image 212.

As described above, the level of the pixel value of each of pixels of the wide dynamic range image 390 generated by the combining process is determined by calculating an amount of electric charge accumulated that is estimated when by high- and low-brightness regions are exposed for the same period of or an output value of an electrical signal corresponding to the estimated amount of accumulated electric charge. For example, let the long-time exposure time be "1" and the short-time exposure time be "0.1". In this case, for a pixel for which the pixel value of the short-time exposure image 212 is selected as an effective pixel value, the pixel value of the short-time exposure image 212 is increased by a factor of ten, and the result is set as a pixel value of the wide dynamic range image 390. The pixel value of the long-time exposure image 211 associated with the corresponding pixel position is discarded.

For a pixel for which the pixel value of the long-time exposure image 211 is selected as an effective pixel value, on the other hand, the pixel value of the long-time exposure image 211 is set directly as a pixel value of the wide dynamic range image 390. The pixel value of the short-time exposure image 212 associated with the corresponding pixel position is discarded.

Accordingly, the wide dynamic range image 390 as a combined image based on the long-time exposure image 211 and the short-time exposure image 212 is generated. The generated wide dynamic range image 390 is input to an intermediate image generator 392 and the output image generator 393.

The intermediate image generator 392 employs the low pass filter (LPF) described with reference to FIG. 11A or 11B, and generates blurred intermediate image data from the wide dynamic range image 390. The intermediate image generator 392 generates blurred intermediate image data from the wide dynamic range image 390 using, for example, the smoothing filter shown in FIG. 11A, the weighting filter shown in FIG. 11B, or the like. For the purpose of blurring an image, the size (the number of taps) of the filter may be as large as about the two-dimensional area of a brightness-change pixel region detected by the image analysis unit 302. The generated intermediate image is input to the output image generator 393.

The output image generator 393 receives the wide dynamic range image 390 from the image combiner 391, the intermediate image data as a blurred image from the intermediate image generator 392, and the brightness-change pixel position information from the image analysis unit 302.

The output image generator 393 generates an output image 395 on the basis of the above received data. For a pixel that is located out of the brightness-change pixel positions input from the image analysis unit 302, a pixel value of the wide dynamic range image 390 is set as a pixel value of the output image 395. Pixel values of pixels at the brightness-change pixel positions input from the image analysis unit 302 are determined on the basis of the pixel value of the corresponding pixel position of the wide dynamic range image 390 input from the image combiner 391 and the intermediate image data as a blurred image input from the intermediate image generator 392.

For example, if a pixel value of the wide dynamic range image 390 associated with a brightness-change pixel position is denoted by [Dv] and a pixel value of the intermediate image as a blurred image associated with the brightness-change pixel position is denoted by [Mv], a pixel value [Rv] of the output image 395 associated with the corresponding pixel position is determined using coefficients a and b by the following equation:

$$[Rv]=a\times[Dv]+b\times[Mv]$$

where a+b=1.

Accordingly, the pixel value [Dv] of the wide dynamic range image 390 and the pixel value [Mv] of the intermediate image as a blurred image are combined at a predetermined a:b ratio to determine the pixel value [Rv] of the output image 395. The parameters a and b are used to set the ratio, and the values of the parameters a and b are adjusted according to characteristics of the imaging element used and the subjective evaluation of a resulting image. For example, the parameters a and b are set to 0.2 and 0.8, respectively.

The pixel value of the output image 395 is calculated using the wide dynamic range image 390 and the intermediate image as a blurred image generated from the wide dynamic range image 390. Those images may be generated using an image obtained using, for example, red, green, and blue single-chip imaging elements, or image data YCbCr obtained by conversion of RGB data, which is composed of a luminance signal Y and color difference signals Cb and Cr, may be processed to calculate an output signal value for each of the signals Y, Cb, and Cr.

Further, the parameters a and b used to calculate the pixel value [Rv] of the output image 395 by adding and combining the pixel value [Dv] of the wide dynamic range image 390 and the pixel value [Mv] of the corresponding pixel of the intermediate image as a blurred image generated from the wide dynamic range image 390 at a predetermined ratio, as given by $[Rv]=a\times[Dv]+b\times[Mv]$, may be calculated separately for the luminance signal Y and the color difference signals Cb and Cr. The parameters a and b may be changed for each of red, green, and blue, or may be changed for each of the signals Y, Cb, and Cr.

The intermediate image data as a blurred image is generated by the intermediate image generator 392 using, for example, the low pass filter described with reference to FIG. 11A or 11B as an image that is blurred by adding neighboring pixel information. In the blurred image, the original gray level still remains in the brightness-change pixel position region detected by the image analysis unit 302, and incorrect brightness or false colors, which can be contained in the wide dynamic range image 390, are combined with the neighboring pixel values and are thus reduced. Therefore, a pixel value of a pixel at a brightness-change pixel position is combined with the intermediate image data as a blurred image and the wide dynamic range image 390, thereby generating a consistent output image that is not greatly deviated from the original pixel value of the subject.

According to the first embodiment of the present invention, therefore, in the process for generating a wide dynamic range image based on an input long-time exposure image and an input short-time exposure image, a pixel value of a brightness-change pixel caused by movement or the like of a subject is determined using the wide dynamic range image and a blurred image generated from the wide dynamic range image. This ensures the generation of a high-quality output image with reduced occurrence of grayscale error or false colors due to a moving subject or the like.

Second Embodiment

An imaging apparatus of a second embodiment of the present invention will be described with respect to an example structure in which erroneous detection of a brightness-change pixel is prevented. The second embodiment is different from the first embodiment in the structure of the image analysis unit 302 in the image processor 203. The remaining structure is similar to that of the first embodiment. The overall structure of the imaging apparatus of the second embodiment is similar to that of the first embodiment described with reference to FIG. 4. The image processor 203 according to the second embodiment basically has the structure described with reference FIG. 8, and the pixel value correction unit 303 in the image processor 203 according to the second embodiment also has a structure similar to that described with reference to FIG. 12.

The second embodiment is different from the first embodiment in the operation of the image analysis unit 302 in the image processor 203. In the second embodiment, erroneous detection is prevented in the process of detecting a brightness-change pixel. Erroneous detection of a brightness-change pixel will be described with reference to FIG. 13.

Figure 13:
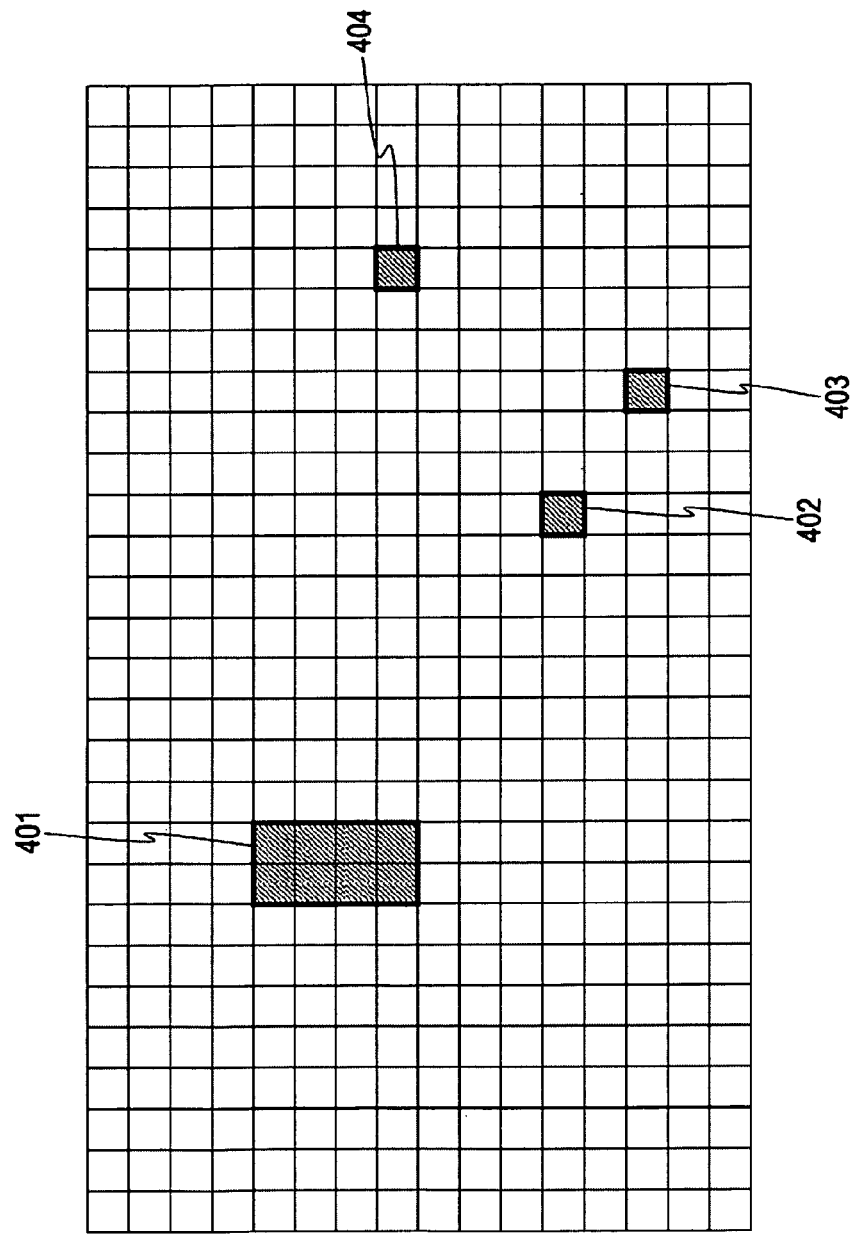
FIG. 13 is a diagram showing erroneous detection of brightness-change pixels.

FIG. 13 shows brightness-change pixels detected by the image analysis unit 302, as with the detection results shown in FIG. 10B described with respect to an example of the process for detecting a brightness-change pixel according to the first embodiment. FIG. 13 shows detected brightness-change pixels 401 to 404.

As described above, the image analysis unit 302 detects brightness-change pixels at (a) a pixel position at which a brightness level of the subject changes from a high brightness level to a low brightness level, and (b) a pixel position at which a brightness level of the subject changes from a low brightness level to a high brightness level.

In the process for detecting (a) a pixel position at which a brightness level of the subject changes from a high brightness level to a low brightness level, it is determined whether or not the determination condition 1 is satisfied, that is, whether or not effective output values are obtained from the short-time exposure image 212 and from the long-time exposure image 211.

In the process for detecting (b) a pixel position at which a brightness level of the subject changes from a low brightness level to a high brightness level, it is determined whether or not the determination condition 2 is satisfied, that is, whether or not a pixel value of the long-time exposure image 211 is saturated and no effective output value is obtained from the short-time exposure image 212.

As a result of the detection of a brightness-change pixel based on the above determination processes, for example, the brightness-change pixels 401 to 404 shown in FIG. 13 are detected. In a case where the brightness level of the subject changes in a photographic period (long-time exposure period) due to, for example, movement of the subject, a certain block of pixels, like the brightness-change pixels 401, is detected. On the other hand, single brightness-change pixels, like the brightness-change pixels 402 to 404 shown in FIG. 13, are detected due to erroneous detection caused by manufacturing variations between pixels, variations in element driving conditions (e.g., intermediate potential), and the like.

In the second embodiment, the image analysis unit 302 of the image processor 203 separately identifies a correctly detected brightness-change pixel that is caused by a change in the brightness level of the subject (e.g., the brightness-change pixels 401 shown in FIG. 13) and an erroneously detected brightness-change pixel that is caused by manufacturing variations between pixels, variations in element driving conditions, and the like (e.g., the brightness-change pixels 402 to 404 shown in FIG. 13), and extracts only the correctly detected brightness-change pixel.

Figure 14:
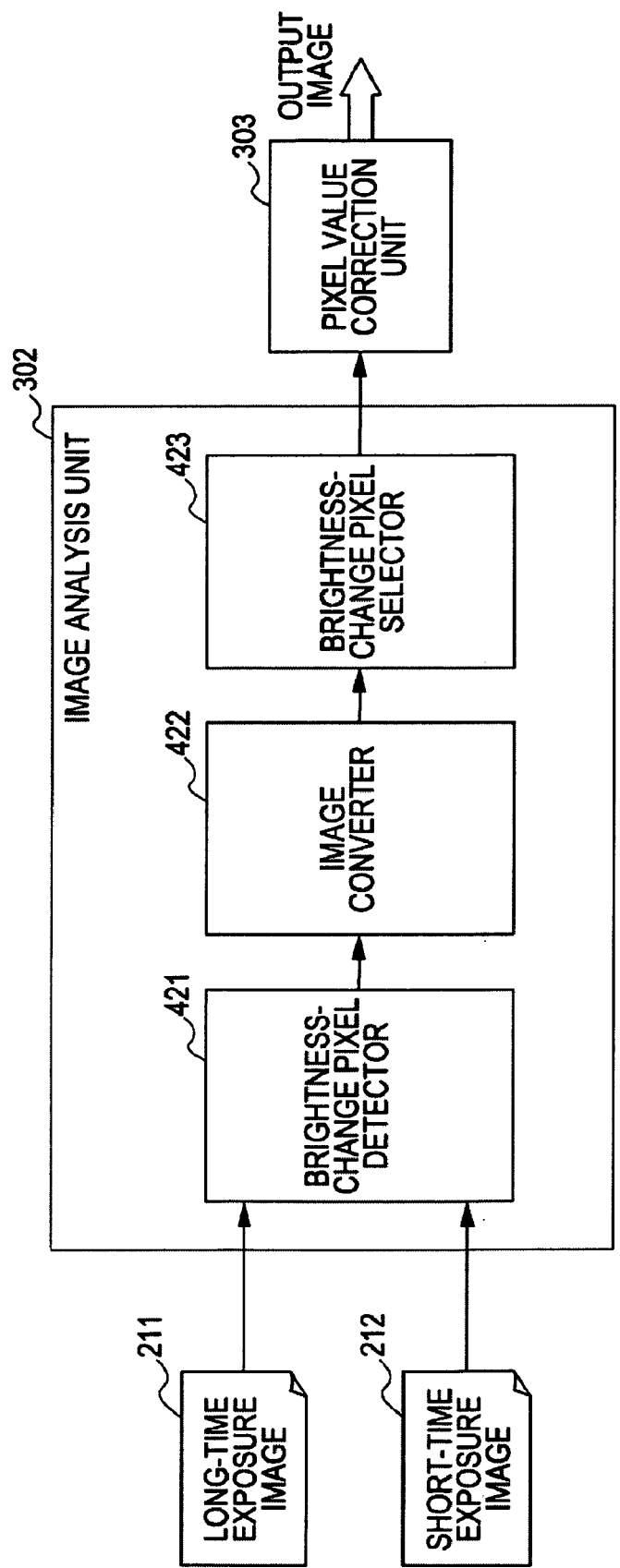
FIG. 14 is a diagram showing the structure and operation of an image analysis unit according to a second embodiment of the present invention.

FIG. 14 shows an example structure of the image analysis unit 302 operable to perform this identification. As shown in FIG. 14, the image analysis unit 302 according to the second embodiment includes a brightness-change pixel detector 421, an image converter 422, and a brightness-change pixel selector 423. As in the first embodiment, the brightness-change pixel detector 421 receives the long-time exposure image 211 and the short-time exposure image 212, and detects brightness-change pixels at (a) a pixel position at which a brightness level of the subject changes from a high brightness level to a low brightness level, and (b) a pixel position at which a brightness level of the subject changes from a low brightness level to a high brightness level according to the determination conditions 1 and 2 described above.

As a result of the detection processes, a detection-result image shown in FIG. 13 is generated. The detection-result image is set as an image in which the brightness-change pixels detected by the brightness-change pixel detector 421 are set to 1 and the remaining pixels are set to 0. For example, in a representation of pixel value levels ranging from 0 to 255, the brightness-change pixels are set to 0 and the remaining pixels are set to 255.

Figure 15:
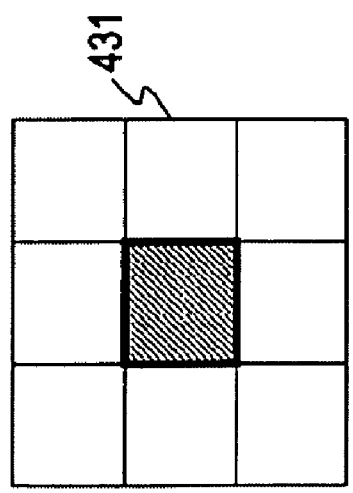
FIG. 15 is a diagram showing a filtering process performed by the image analysis unit according to the second embodiment.

The image converter 422 receives the detection-result image, and performs filtering using a filter. The filtering process will specifically be described with reference to FIG. 15. As shown in FIG. 15, a detection-result image 431 in which a brightness-change pixel is set to 1 and the remaining pixels are set to 0 is multiplied by a three-tap smoothing filter 432. Thus, a filter result 433 in which an area of 3×3 pixels has a pixel value "0.11" is generated.

FIG. 15 shows an example of the filtering process performed on a region in which a single independent brightness-change pixel is detected. As a result of the filtering process performed on the region in which a single independent brightness-change pixel is detected, the filter result 433 shown in FIG. 15 in which the area of 3×3 pixels has a pixel value "0.11" is obtained.

In a case where the brightness level of the subject changes due to movement or the like of the subject, generally, a certain block of pixels is detected as a brightness-change pixel region. If the smoothing filter 432 shown in FIG. 15 is applied to such a region, the filter result 433 shown in FIG. 15 in which the area of 3×3 pixels has a pixel value "0.11" is not obtained but a result with a pixel value greater than 0.11 is obtained.

The filter result obtained by the image converter 422 is input to the brightness-change pixel selector 423. The brightness-change pixel selector 423 separately identifies a correctly detected brightness-change pixel, that is, a brightness-change pixel that is detected on the basis of a change in the brightness level of the subject, and an erroneously detected brightness-change pixel caused by device error or the like on the basis of the pixel values of the pixels contained in the filter result. Specifically, if a pixel value less than or equal to "0.11" is detected in the pixel values of the pixels contained in the filter result, it is determined that the pixel corresponding to the detected pixel value is an erroneously detected brightness-change pixel.

Accordingly, the erroneously detected brightness-change pixel is excluded, and only the correctly detected brightness-change pixel, that is, pixel position information concerning the brightness-change pixel detected on the basis of a change in the brightness level of the subject, is extracted and output to the pixel value correction unit 303. This can exclude an erroneously detected pixel caused by manufacturing variations between pixels, variations in element driving conditions (e.g., intermediate potential), and the like, and position information concerning only a correctly detected brightness-change pixel resulting from the subject can be output to the pixel value correction unit 303.

In FIG. 15, the brightness-change pixel selector 423 uses the pixel value "0.11" contained in a filter result as a threshold value by way of example of the technique for excluding an independent brightness-change pixel to determine that a pixel with a pixel value less than or equal to "0.11" is an erroneously detected region. For example, to exclude a set of about two brightness-change pixels arranged side-by-side, the brightness-change pixel selector 423 may change a threshold value to be used. Specifically, a threshold value slightly greater than "0.11" may be used to exclude a set of about two brightness-change pixel regions arranged side-by-side.

Next, a process for preventing missing of detection of a correctly detected brightness-change pixel, namely, a brightness-change pixel within a pixel region in which the brightness level of the subject changes in a photographic period (long-time exposure period) due to movement or the like of the subject, will be described. This process is also performed by the image analysis unit 302 shown in FIG. 14. In this case, however, the image converter 422 employs a filter different from the above-described filter used to exclude an erroneously detected brightness-change pixel.

For example, the brightness-change pixel detector 421 outputs the detection result shown in FIG. 13. If it is assumed that the brightness-change pixels 401 included in the detection result shown in FIG. 13 are correctly detected pixels, detection missing generally occurs around the correctly detected brightness-change pixels 401. Further, as a result of the exclusion of an erroneously detected pixel in the manner described above, the range of the correctly detected brightness-change pixels 401 might be narrowed. In other words, the filtering process using the filter 432 shown in FIG. 15 might cause generation of a filter result in which the range of the correctly detected brightness-change pixels 401 is narrowed to cause the brightness-change pixel selector 423 to determine that only a range smaller than the actual range of the correctly detected brightness-change pixels 401 is a correctly detected brightness-change pixel range.

Figure 16:
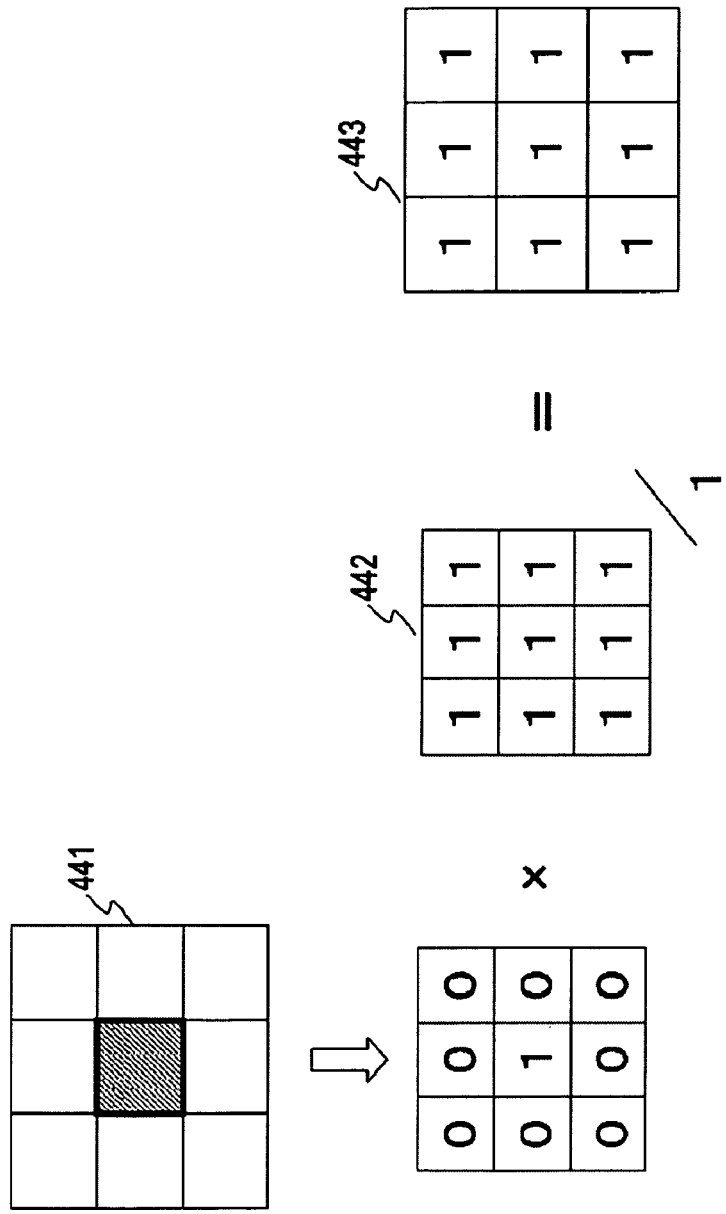
FIG. 16 is a diagram showing a filtering process performed by the image analysis unit according to the second embodiment.

To prevent such missing of detection, the range of the correctly detected brightness-change pixels 401 is extended. In this case, a filter 442 shown in FIG. 16 is used. Similarly to the filter 432 described above with reference to FIG. 15, a detection-result image 441 in which a brightness-change pixel is set to 1 and the remaining pixels are set to 0 is multiplied by the three-tap filter 442. Thus, a filter result 443 in which an area of 3×3 pixels has a pixel value "1" is generated.

In the example shown in FIG. 16, a three-tap filter is applied to extend the pixel value range of the pixel at the center to the outside by one pixel. The number of pixels by which to extend the range is determined according to the conditions set at the time of detection. The size of the range to extend corresponds to the number of taps.

The filter result obtained by the image converter 422 is input to the brightness-change pixel selector 423. The brightness-change pixel selector 423 detects a correctly detected brightness-change pixel, that is, a brightness-change pixel detected on the basis of a change in the brightness level of the subject, on the basis of the pixel values of the pixels contained in the filter result. Specifically, if a pixel having a pixel value "1" is included in the filter result, it is determined that the pixel is a correctly detected brightness-change pixel.

The brightness-change pixel selector 423 may further detect, as well as detecting a correctly detected brightness-change pixel position on the basis of the filter result of the image converter 422, a brightness-change pixel position on the basis of input original detection result information that is not subjected to filtering. The brightness-change pixel selector 423 may separately store the two types of detected information, that is, (1) brightness-change pixel position information based on the original detection result, and (2) brightness-change pixel position information based on the filter result, and may output them to the pixel value correction unit 303. The pixel value correction unit 303 may change the values of the above-described parameters, which are used to generate an output image, depending on the brightness-change pixel in which the pixel value range is extended using a filter and the initially detected brightness-change pixel according to the two types of information. Specifically, as described above, if a pixel value of the wide dynamic range image 390 is denoted by [Dv] and a pixel value of the intermediate image as a blurred image is denoted by [Mv], a pixel value [Rv] of the corresponding pixel position of the output image 395 is determined using coefficients a and b by the following equation:

$$[Rv] = a \times [Dv] + b \times [Mv]$$

For example, the parameters a and b may be set to 0.2 and 0.8, respectively, to determine a pixel value of a pixel within the initially detected brightness-change region that is not subjected to filtering, and the parameters a and b may be set to 0.4 and 0.6, respectively, to determine a pixel value of a pixel within the brightness-change region newly detected using a filter. This ensures a more smooth and natural output image.

Furthermore, after filtering is performed using the filter 432 described with reference to FIG. 15 to exclude an erroneously detected pixel by the brightness-change pixel selector 423, filtering may further be performed using the filter 442 described with reference to FIG. 16 to correctly select a brightness-change pixel by the brightness-change pixel selector 423. Alternatively, one of the above filtering processes may be performed.

Third Embodiment

An image processing apparatus according to a third embodiment of the present invention will be described with respect to an example of modification of the blurred image generation process performed by the intermediate image generator (blurring process) 392 in the pixel value correction unit 303 according to the first embodiment shown in FIG. 12.

In the first embodiment, as described with reference to FIG. 12, the intermediate image generator (blurring process) 392 in the pixel value correction unit 303 shown in FIG. 12 receives the wide dynamic range image 390 and generates a blurred image using the low pass filter shown in FIG. 11A or 11B by way of example.

In a case where the subject largely moves, however, the number of taps of the filter increases, and it may be difficult to implement in hardware. In the third embodiment, a blurred image is generated by enlarging and reducing an image. An image is reduced to reduce the amount of information, and the resulting image with the reduced information is enlarged to thereby achieve advantages similar to those of the blurring process. The reducing and enlarging process is based on, for example, a bilinear (bilinear interpolation) process.

Figure 17:
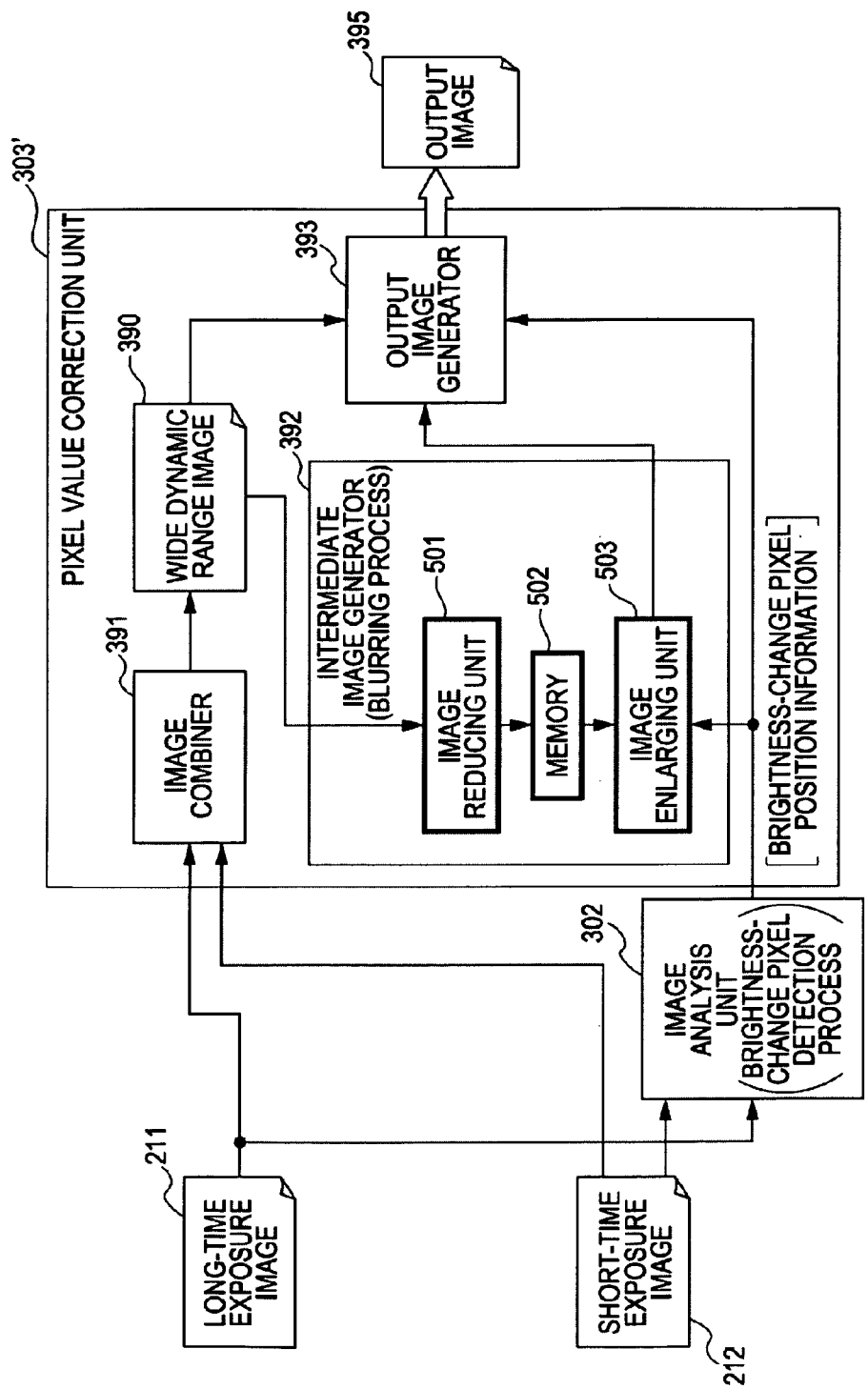
FIG. 17 is a diagram showing the structure and operation of a pixel value correction unit according to a third embodiment of the present invention.

The structure and operation of a pixel value correction unit 303' according to the third embodiment will be described with reference to FIG. 17. The pixel value correction unit 303' according to the third embodiment is configured such that the structure of the intermediate image generator 392 in the pixel value correction unit 303 according to the first embodiment described with reference to FIG. 12 is modified.

The intermediate image generator 392 includes an image reducing unit 501 configured to receive and reduce the wide dynamic range image 390 to generate a reduced image, a memory 502 configured to store the reduced image generated by the image reducing unit 501, and an image enlarging unit 503 configured to retrieve and enlarge the reduced image from the memory 502.

The image reducing unit 501 receives the wide dynamic range image 390 and performs a bilinear (bilinear interpolation) operation to generate a reduced image with vertical and horizontal dimensions reduced by, for example, 1/16 (area by 1/256). The reduced image is stored in the memory 502. The image enlarging unit 503 retrieves the reduced image stored in the memory 502, and enlarges the retrieved image using a bilinear (bilinear interpolation) process. The enlarged image corresponds to data obtained by blurring the wide dynamic range image 390.

Since blurred image data is used only for an image portion corresponding to the position of a brightness-change pixel at which a pixel value of a blurred image is used by the output image generator 393, the image enlarging unit 503 may enlarge a limited image region, including the position of the brightness-change pixel, of the reduced image stored in the memory 502 to generate a partial image. In this case, the image enlarging unit 503 receives the brightness-change pixel position information from the image analysis unit 302, and determines a partial region to be subjected to the enlargement process on the basis of the received brightness-change pixel position information. The image enlarging unit 503 enlarges the partial region to generate an enlarged image (blurred image), and outputs the enlarged image to the output image generator 393.

Fourth Embodiment

In the foregoing embodiments, the intermediate image generator (blurring process) 392 generates a blurred image from the wide dynamic range image 390 using the low pass filter shown in FIG. 11A or 11B or, as described above, by performing an image reducing and enlarging process.

Depending on the photographic environments (such as a light source, the color of a subject, and the speed of the subject), a high-color-saturation false color may be produced in a moving subject area, and the false color may be pronounced even in a blurred image. An imaging apparatus according to a fourth embodiment of the present invention is operable to avoid such a problem.

Figure 18:
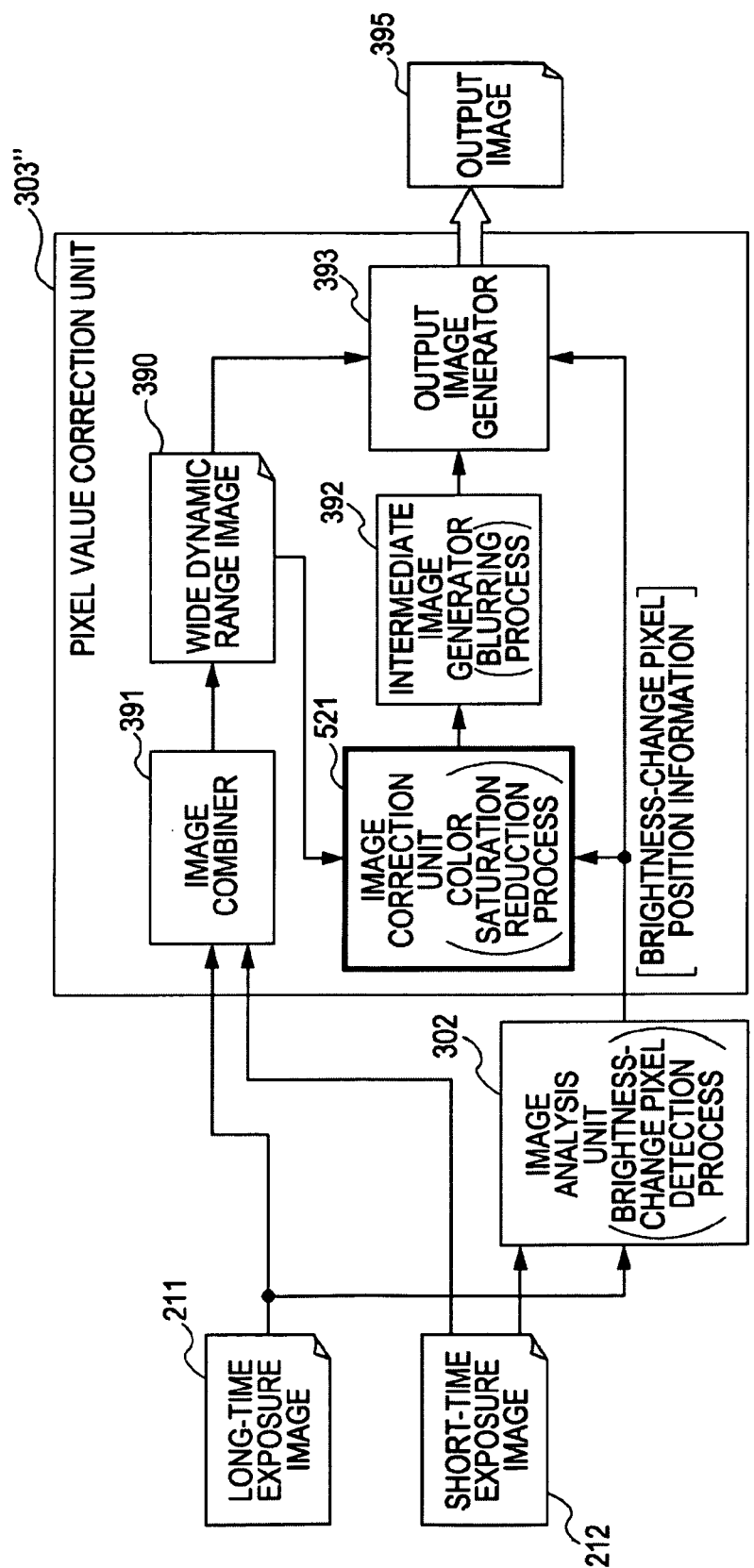
FIG. 18 is a diagram showing the structure and operation of a pixel value correction unit according to a fourth embodiment of the present invention.

FIG. 18 shows an example structure of a pixel value correction unit 303" according to the fourth embodiment. The pixel value correction unit 303" according to the fourth embodiment is configured such that an image correction unit (color saturation reduction process) 521 is further provided before the intermediate image generator 392 in the pixel value correction unit 303 according to the first embodiment described with reference to FIG. 12.

The image correction unit (color saturation reduction process) 521 receives the wide dynamic range image 390, and performs a color saturation reduction process to generate a reduced-saturation image with color saturation reduced. The reduced-saturation image is input to the intermediate image generator 392. The intermediate image generator 392 blurs the reduced-saturation image to generate a blurred image.

The image correction unit (color saturation reduction process) 521 reduces the color saturation of the wide dynamic range image 390. The wide dynamic range image 390 is separated into luminance and color difference signals such as Y, Cb, and Cr, and reduces the color difference signals only in a brightness-change pixel region. The image correction unit (color saturation reduction process) 521 receives brightness-change pixel position information from the image analysis unit 302, and reduces the color difference signals only in a brightness-change pixel region according to the received information.

Figure 19:
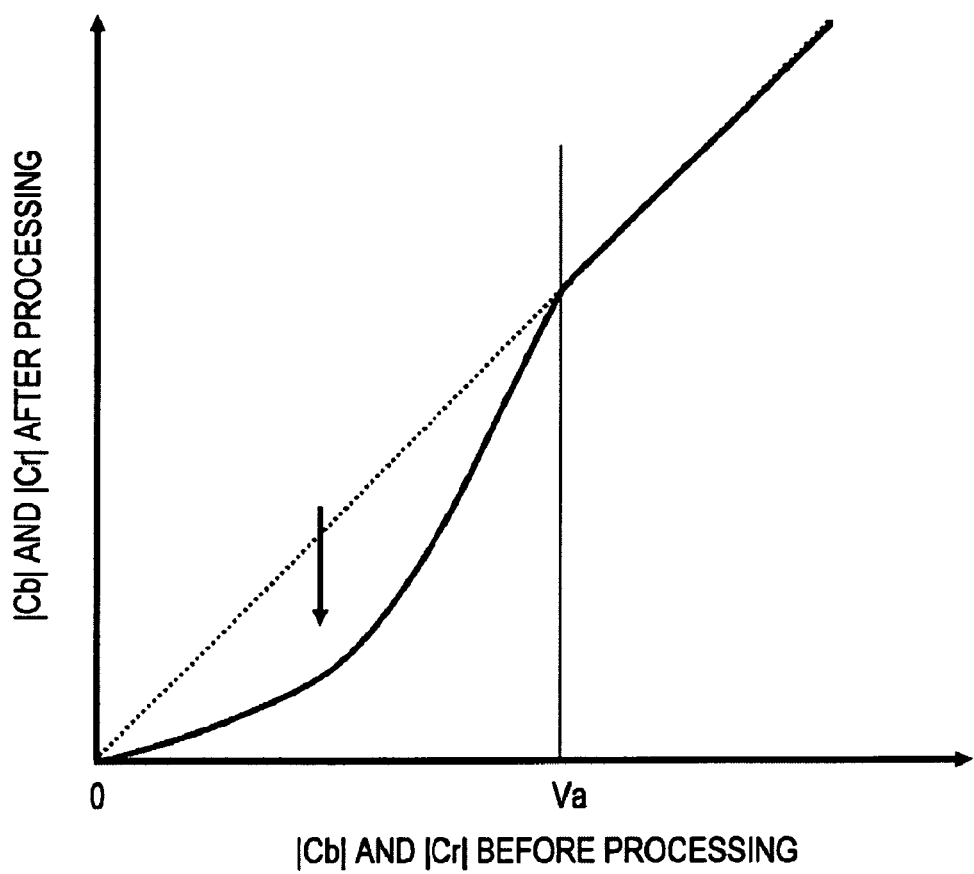
FIG. 19 is a diagram showing a color saturation reduction process performed by the pixel value correction unit according to the fourth embodiment.

FIG. 19 shows an example of the rate by which the color difference signals are reduced. In FIG. 19, the abscissa axis represents the absolute value of the color difference signals Cb and Cr of an input image or the wide dynamic range image 390, and the ordinate axis represents the absolute value of the color difference signals Cb and Cr of an image obtained as a result of the color saturation reduction process by the image correction unit (color saturation reduction process) 321. As shown in FIG. 19, the color saturation is reduced in a sectional region in which the absolute value of the color difference signals Cb and Cr of the wide dynamic range image 390 ranges from 0 to Va. The color saturation range in which to perform the above process is different depending on imaging elements or photographing conditions, and is optimized for each imaging system.

The intermediate image generator 392 blurs the reduced-saturation image to generate a blurred image. By performing the color saturation reduction process before the generation of a blurred image, even a high-color-saturation false color produced in a moving subject area can be prevented from being pronounced in the blurred image, and the effect of such a false color on a final output image can be reduced.

Fifth Embodiment

Figure 20:
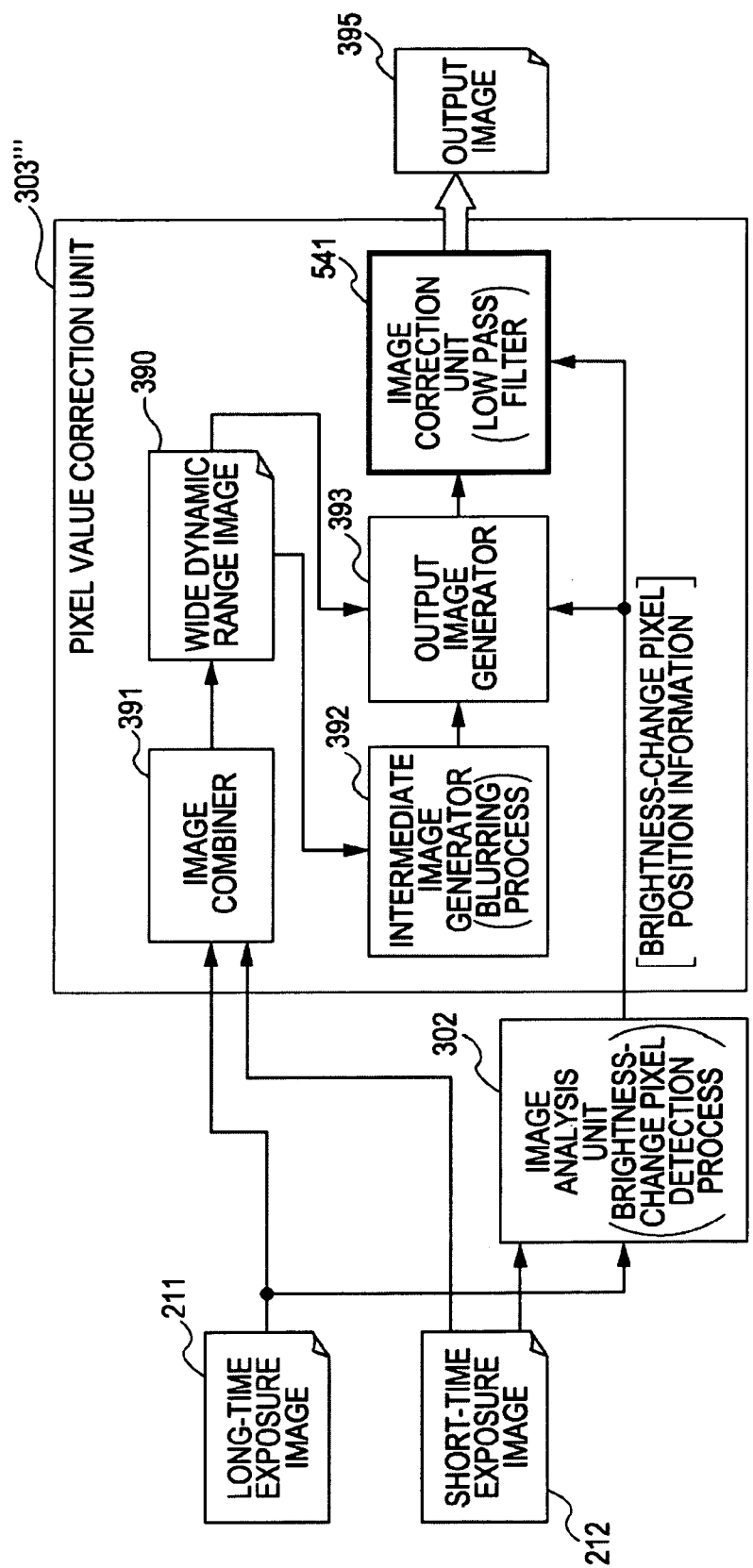
FIG. 20 is a diagram showing the structure and operation of a pixel value correction unit according to a fifth embodiment of the present invention.

An imaging apparatus according to a fifth embodiment of the present invention is configured such that a low pass filter is activated in the final stage of the processing of an output image. FIG. 20 shows an example structure of a pixel value correction unit 303''' according to the fifth embodiment. The pixel value correction unit 303''' according to the fifth embodiment is configured such that an image correction unit (low pass filter) 541 is further provided after the output image generator 393 in the pixel value correction unit 303 according to the first embodiment described with reference to FIG. 12.

As previously described in the first embodiment, the output image generator 393 receives the wide dynamic range image 390 from the image combiner 391, the intermediate image data as a blurred image from the intermediate image generator 392, and the brightness-change pixel position information from the image analysis unit 302.

For a pixel that is located out of the brightness-change pixel positions input from the image analysis unit 302, a pixel value of the wide dynamic range image 390 is set as a pixel value of the output image 395. Pixel values of pixels at the brightness-change pixel positions input from the image analysis unit 302 are determined on the basis of the pixel value of the corresponding pixel position of the wide dynamic range image 390 input from the image combiner 391 and the intermediate image data as a blurred image input from the intermediate image generator 392. Specifically, if a pixel value of the wide dynamic range image 390 associated with a brightness-change pixel position is denoted by [Dv] and a pixel value of the intermediate image as a blurred image associated with the brightness-change pixel position is denoted by [Mv], a pixel value [Rv] of the corresponding pixel position of the output image 395 is determined using coefficients a and b by the following equation:

$$[Rv]=a \times [Dv]+b \times [Mv]$$

Accordingly, the pixel value of the output image 395 is determined.

In the image generated by the output image generator 393, unnatural grayscale may be caused in a pixel region where pixel values are replaced or at a boundary between the pixel region and a region where no pixel values are replaced. The image correction unit (low pass filter) 541 applies a low pass filter to the image generated by the output image generator 393 to generate a final output image.

The shape or configuration of the filter used in the image correction unit (low pass filter) 541 may be similar to that of the filter described above with reference to FIG. 11A or 11B. In other words, the smoothing filter shown in FIG. 11A, the weighting filter shown in FIG. 11B, or the like may be used. The size (number of taps) of the filter may be preferably enough to include a pixel region where pixel values are replaced or a greater region. Preferably, the image correction unit (low pass filter) 541 receives brightness-change pixel position information from the image analysis unit 302, and determines the size (number of taps) of the filter used before performing the processing.

The present invention has been described in detail with respect to specific embodiments thereof. However, it is to be understood that a variety of modifications or alterations can be made by persons skilled in the art without departing from the scope of the present invention. That is, exemplary embodiments of the present invention have been disclosed, and are not construed as limiting the present invention. The scope of the present invention should be determined by the appended claims.

The series of processes described herein can be implemented by hardware or software, or a combination thereof. When the series of processes is implemented by software, a program having a processing sequence may be installed into an internal memory of a computer incorporated in dedicated hardware and executed, or may be installed onto a general-purpose computer capable of executing various types of processing and executed.

The program may be recorded in advance on a recording medium such as a hard disk or a read only memory (ROM). Alternatively, the program may be temporarily or persistently stored (or recorded) in a removable recording medium such as a flexible disk, a compact disc read only memory (CD-ROM), a magneto-optical (MO) disk, a digital versatile disc (DVD), a magnetic disk, or a semiconductor memory. Such removable recording media can be provided as packaged software.

The program is installed onto a computer from such removable recording media, or wirelessly transferred to the computer from a download site or transferred via wire to the computer via a network such as a local area network (LAN) or the Internet so that the computer can receive the program transferred in the manner described above and can install the program into an internal recording medium such as a hard disk.

The processes described herein may be executed in parallel or individually, as well as in the orders described herein, according to the performance of the apparatus that performs the processes. The term system as used herein refers to a logical set of apparatuses regardless of whether or not the apparatuses are housed in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a processor configured to:
   receive input image data comprising a long-time exposure image and a short-time exposure image;
   detect a brightness-change pixel in which it is determined that a brightness change has occurred during a photographic period corresponding to a long-time exposure time on the basis of analysis of pixel values in the long-time exposure image and the short-time exposure image; and
   correct a pixel value of the brightness-change pixel detected by the image analysis unit, wherein the pixel value correction includes:
   selectively combining pixel values in the long-time exposure image and pixel values in the short-time exposure image to generate a combined image,
   generating an intermediate image, the intermediate image being a blurred image of the combined image, and
   determining a pixel value of the brightness-change pixel using a pixel value of a corresponding pixel in the combined image and a pixel value of a corresponding pixel in the intermediate image, the corresponding pixels in the combined and intermediate images being located at positions corresponding to the brightness-change pixel.

2. The image processing apparatus according to claim 1, wherein the processor is configured to determine a pixel value of the corresponding pixel in an output image using the following equation:

$$[Rv]=a \times [Dv]+b \times [Mv]$$

where [Rv] denotes the pixel value of the corresponding pixel in the output image, [Dv] denotes the pixel value of the corresponding pixel in the combined image, [Mv] denote the pixel value of the corresponding pixel in the intermediate image, and a and b denote coefficients, wherein a+b=1.

3. The image processing apparatus according to claim 1, wherein the processor is configured to detect a pixel position at which an effective output value is obtained from the short-time exposure image and at which an effective output value is obtained from the long-time exposure image, and is configured to determine that a pixel that is located at the detected pixel position is a brightness-change pixel whose brightness level changes from a high brightness level to a low brightness level.

4. The image processing apparatus according to claim 1, wherein the processor is configured to detect a pixel position at which a pixel value in the long-time exposure image is saturated and at which no effective output value is obtained from the short-time exposure image, and is configured to determine that a pixel that is located at the detected pixel position is a brightness-change pixel whose brightness level changes from a low brightness level to a high brightness level.

5. The image processing apparatus according to claim 1, wherein the processor is configured to perform image conversion on a detection-result image that is based on the detected brightness-change pixel using a smoothing filter, and is configured to exclude a brightness-change pixel that is erroneously detected on the basis of an image obtained as a result of the image conversion.

6. The image processing apparatus according to claim 1, wherein the processor is configured to perform image conversion on a detection-result image that is based on the detected brightness-change pixel using a filter, and is configured to enlarge a brightness-change pixel region.

7. The image processing apparatus according to claim 6, wherein the processor is configured to determine a pixel value of the corresponding pixel in an output image using coefficients by the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denotes the pixel value of the corresponding pixel in the intermediate image, and a and b denote the coefficients, wherein a+b=1, and wherein the processor is further configured to determine the pixel value of the corresponding pixel in the output image by using, as the coefficients, a first set of coefficients used to determine pixel values of a brightness-change pixel region that is detected on the basis of the combined image, and a second set of coefficients to determine pixel values of the brightness-change pixel region enlarged using the filter, the first set of coefficients and the second set of coefficients having different values from each other.

8. The image processing apparatus according to claim 1, wherein the processor is configured to apply a smoothing filter to the combined image to generate a blurred image.

9. The image processing apparatus according to claim 1, wherein the processor is configured to reduce and enlarge the combined image to generate a blurred image.

10. The image processing apparatus according to claim 1, wherein the processor is further configured to reduce a color saturation of the combined image generated to generate a saturation-reduced image, and
wherein the processor is further configured to receive the saturation-reduced image and to generate a blurred image.

11. The image processing apparatus according to claim 1, wherein the processor is further configured to perform an image correction process of applying a low pass filter.

12. The image processing apparatus according to any of claims 1 to 11, wherein an exposure period in which the long-time exposure image is generated includes an exposure period in which the short-time exposure image is generated, and wherein the short-time exposure image and the long-time exposure image are images generated from an identical pixel by a single imaging element.

13. An imaging apparatus comprising:
an imaging device configured to generate, by a processor, image data comprising a long-time exposure image and a short-time exposure image, wherein the processor is configured to:
detect a brightness-change pixel in which it is determined that a brightness change has occurred during a photographic period corresponding to a long-time exposure time on the basis of analysis of pixel values in the long-time exposure image and the short-time exposure image; and
correct a pixel value of the brightness-change pixel detected by the image analysis unit, wherein the correcting a pixel value includes:
selectively combining pixel values in the long-time exposure image and pixel values in the short-time exposure image to generate a combined image,
generating an intermediate image, the intermediate image being a blurred image of the combined image, and
determining a pixel value of the brightness-change pixel detected by the image analysis unit using a pixel value of a corresponding pixel in the combined image and a pixel value of a corresponding pixel in the intermediate image, the corresponding pixel in the combined and intermediate images being located at positions corresponding to the brightness-change pixel.

14. The imaging apparatus according to claim 13, wherein an exposure period in which the long-time exposure image is generated includes an exposure period in which the short-time exposure image is generated, and
wherein the imaging device is configured to generate the short-time exposure image and the long-time exposure image from an identical pixel using a single imaging element.

15. An image processing method for performing image processing in an image processing apparatus, the image processing method comprising the steps of:
by an image input unit, receiving a long-time exposure image and a short-time exposure image;
by an image analysis unit, detecting a brightness-change pixel in which it is determined that a brightness change has occurred during a photographic period corresponding to a long-time exposure time on the basis of analysis of pixel values in the long-time exposure image and the short-time exposure image; and
by a pixel value correction unit, correcting a pixel value of the detected brightness-change pixel,
wherein the step of correcting includes the steps of
generating a combined image by selectively combining pixel values in the long-time exposure image and pixel values in the short-time exposure image,
generating an intermediate image, the intermediate image being a blurred image of the combined image, and
determining a pixel value of the brightness-change pixel detected by the image analysis unit using a pixel value of a corresponding pixel in the combined image and a pixel value of the corresponding pixel in the intermediate image, the corresponding pixel in the combined and intermediate images being located at positions corresponding to the brightness-change pixel.

16. The image processing method according to claim 15, wherein the step of determining includes the step of:

determining a pixel value of the corresponding pixel in an output image using the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denote the pixel value of the corresponding pixel in the intermediate image, and a and b denote coefficients, wherein a+b=1.

17. The image processing method according to claim 15, wherein the step of detecting includes the step of:
detecting a pixel position at which an effective output value is obtained from the short-time exposure image and at which an effective output value is obtained from the long-time exposure image to determine that a pixel that is located at the detected pixel position is a brightness-change pixel whose brightness level changes from a high brightness level to a low brightness level.

18. The image processing method according to claim 15, wherein the step of detecting includes the step of:
detecting a pixel position at which a pixel value in the long-time exposure image is saturated and at which no effective output value is obtained from the short-time exposure image to determine that a pixel that is located at the detected pixel position is a brightness-change pixel whose brightness level changes from a low brightness level to a high brightness level.

19. The image processing method according to claim 15, wherein the step of detecting includes the step of:
performing image conversion on a detection-result image that is based on the detected brightness-change pixel using a smoothing filter to exclude a brightness-change pixel that is erroneously detected on the basis of an image obtained as a result of the image conversion.

20. The image processing method according to claim 15, wherein the step of detecting includes the step of:
performing image conversion on a detection-result image that is based on the detected brightness-change pixel using a filter to enlarge a brightness-change pixel region.

21. The image processing method according to claim 20, wherein the step of determining includes the step of:
determining a pixel value of the corresponding pixel in an output image using coefficients by the following equation:

$$[Rv]=a\times[Dv]+b\times[Mv]$$

where [Rv] denotes the pixel value of the corresponding pixel in the output image, [Dv] denotes the pixel value of the corresponding pixel in the combined image, [Mv] denotes the pixel value of the corresponding pixel in the intermediate image, and a and b denote the coefficients, wherein a+b=1,
wherein the pixel value of the corresponding pixel in the output image is determined using, as the coefficients, a first set of coefficients used to determine pixel values of a brightness-change pixel region that is detected on the basis of the combined image, and a second set of coefficients to determine pixel values of the brightness-change pixel region enlarged using the filter, the first set of coefficients and the second set of coefficients having different values from each other.

22. The image processing method according to claim 15, wherein the step of generating an intermediate image includes the step of:
applying a smoothing filter to the combined image to generate a blurred image.

23. The image processing method according to claim 15, wherein the step of generating an intermediate image includes the step of:
reducing and enlarging the combined image to generate a blurred image.

24. The image processing method according to claim 15, wherein the step of correcting further includes the step of:
reducing a color saturation of the generated combined image to generate a saturation-reduced image, and
wherein the step of generating an intermediate image generates, upon receiving the generated saturation-reduced image, a blurred image.

25. The image processing method according to claim 15, wherein the step of correcting further includes the step of:
performing an image correction process of applying a low pass filter to an image generated in the step of determining.

26. The image processing method according to any of claims 15 to 25, wherein an exposure period in which the long-time exposure image is generated includes an exposure period in which the short-time exposure image is generated, and
wherein the short-time exposure image and the long-time exposure image are images generated from an identical pixel by a single imaging element.

27. A non-transitory computer storage medium comprising a computer program for causing an image processing apparatus to execute image processing, the computer program comprising the steps of:
causing an image input unit to receive a long-time exposure image and a short-time exposure image;
causing an image analysis unit to detect a brightness-change pixel in which it is determined that a brightness change has occurred during a photographic period corresponding to a long-time exposure time on the basis of analysis of pixel values in the long-time exposure image and the short-time exposure image; and
causing a pixel value correction unit to correct a pixel value of the brightness-change pixel detected in the step of causing an image analysis unit to detect a brightness-change pixel,
wherein the step of causing a pixel value correction unit to correct a pixel value includes the steps of
generating a combined image by selectively combining pixel values in the long-time exposure image and pixel values in the short-time exposure image,
generating a blurred image of the combined image, and
generating an output image by determining a pixel value of the brightness-change pixel detected by the image analysis unit using a pixel value of a corresponding pixel in the combined image and a pixel value of the corresponding pixel in the intermediate image, the corresponding pixel in the combined and intermediate images being located at positions corresponding to the brightness-change pixel.

* * * * *